(12) United States Patent
Bassin et al.

(10) Patent No.: US 8,689,188 B2
(45) Date of Patent: Apr. 1, 2014

(54) SYSTEM AND METHOD FOR ANALYZING ALTERNATIVES IN TEST PLANS

(75) Inventors: Kathryn A. Bassin, Endicott, NY (US); Howard M. Hess, Chicago, IL (US); Steven Kagan, Oakbrook Terrace, IL (US); Shao C. Li, Beijing (CN); Zhong J. Li, Beijing (CN); He H. Liu, Beijing (CN); Susan E. Skrabanek, Atlanta, GA (US); Hua F. Tan, Beijing (CN); Jun Zhu, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 566 days.

(21) Appl. No.: 12/557,886

(22) Filed: Sep. 11, 2009

(65) Prior Publication Data
US 2011/0066890 A1    Mar. 17, 2011

(51) Int. Cl.
*G06F 9/44*    (2006.01)

(52) U.S. Cl.
USPC .......... 717/124; 702/182; 702/186; 717/100; 717/101; 717/125; 714/37; 714/38.1; 714/46

(58) Field of Classification Search
None
See application file for complete search history.

(56) References Cited

U.S. PATENT DOCUMENTS

| | | | |
|---|---|---|---|
| 5,539,652 A * | 7/1996 | Tegethoff | 703/14 |
| 5,905,856 A | 5/1999 | Ottensooser | 714/38.1 |
| 6,332,211 B1 * | 12/2001 | Pavela | 717/130 |
| 6,442,748 B1 | 8/2002 | Bowman-Amuah | 717/108 |
| 6,456,506 B1 | 9/2002 | Lin | 361/816 |
| 6,477,471 B1 * | 11/2002 | Hedstrom et al. | 702/34 |
| 6,519,763 B1 | 2/2003 | Kaufer et al. | 717/101 |
| 6,546,506 B1 * | 4/2003 | Lewis | 714/38.1 |
| 6,601,017 B1 * | 7/2003 | Kennedy et al. | 702/182 |
| 6,601,233 B1 | 7/2003 | Underwood | 717/102 |
| 6,725,399 B1 | 4/2004 | Bowman | 714/38.14 |
| 6,889,167 B2 | 5/2005 | Curry | 702/183 |
| 6,901,535 B2 | 5/2005 | Yamauchi et al. | 714/38.12 |
| 6,988,055 B1 | 1/2006 | Rhea et al. | 702/186 |
| 7,080,351 B1 * | 7/2006 | Kirkpatrick et al. | 717/102 |
| 7,200,775 B1 | 4/2007 | Rhea et al. | 714/27 |
| 7,231,549 B1 | 6/2007 | Rhea et al. | 714/25 |
| 7,334,166 B1 | 2/2008 | Rhea et al. | 714/46 |
| 7,451,009 B2 | 11/2008 | Grubb et al. | 700/100 |
| 7,630,914 B2 * | 12/2009 | Veeningen et al. | 705/7.28 |
| 7,788,647 B2 | 8/2010 | Martin et al. | 717/135 |
| 7,809,520 B2 | 10/2010 | Adachi | 702/119 |
| 7,861,226 B1 | 12/2010 | Episkopos et al. | 717/124 |
| 7,886,272 B1 | 2/2011 | Episkopos et al. | 717/124 |
| 7,917,897 B2 | 3/2011 | Bassin et al. | 717/131 |
| 7,984,304 B1 | 7/2011 | Waldspurger et al. | 713/187 |
| 8,001,530 B2 * | 8/2011 | Shitrit | 717/124 |

(Continued)

OTHER PUBLICATIONS

'Choosing the Right Software Method for the Job' by Scott W. Ambler, from agiledta.org, copyright 2002-2006 by Scott W. Ambler.*
'ASTQB—ISTQB Software Testing Certification: ISTQB Syllabi,' copyright 2008, ASTQB.*
'Software Engineering Economics' by Barry W. Boehm, IEEE Transactions on Software Engineering, vol. SE-10, No. 1, Jan. 1984.*

(Continued)

*Primary Examiner* — Steven Snyder
(74) *Attorney, Agent, or Firm* — Matthew Chung; Roberts Mlotkowski Safran & Cole, P.C.

(57) ABSTRACT

A method includes creating an initial test plan including initial estimates of effort and defect distributions, creating an alternative test plan including alternative estimates of effort and defect distributions, and displaying at least one metric of the initial test plan and the alternative test plan side by side for comparison by a user.

27 Claims, 24 Drawing Sheets

(56) References Cited

U.S. PATENT DOCUMENTS

| | | | |
|---|---|---|---|
| 8,191,044 B1 | 5/2012 | Berlik et al. | 717/124 |
| 8,539,438 B2* | 9/2013 | Bassin et al. | 717/101 |
| 2001/0052108 A1 | 12/2001 | Bowman-Amuah | 717/100 |
| 2002/0078401 A1 | 6/2002 | Fry | 714/30 |
| 2002/0188414 A1 | 12/2002 | Nulman | 702/119 |
| 2003/0018952 A1* | 1/2003 | Roetzheim | 717/101 |
| 2003/0033191 A1 | 2/2003 | Davies et al. | 705/7.14 |
| 2003/0058277 A1 | 3/2003 | Bowman-Amuah | 715/765 |
| 2003/0070157 A1* | 4/2003 | Adams et al. | 717/101 |
| 2003/0196190 A1* | 10/2003 | Ruffolo et al. | 717/124 |
| 2004/0205727 A1 | 10/2004 | Sit et al. | 717/125 |
| 2004/0267814 A1 | 12/2004 | Ludwig et al. | 1/1 |
| 2005/0071807 A1 | 3/2005 | Yanavi | 717/104 |
| 2005/0102654 A1 | 5/2005 | Henderson et al. | 717/126 |
| 2005/0114828 A1* | 5/2005 | Dietrich et al. | 717/101 |
| 2005/0144529 A1 | 6/2005 | Gotz et al. | 714/38.1 |
| 2005/0209866 A1* | 9/2005 | Veeningen et al. | 705/1 |
| 2005/0283751 A1 | 12/2005 | Bassin et al. | 717/100 |
| 2006/0047617 A1 | 3/2006 | Bacioiu et al. | 706/59 |
| 2006/0248504 A1 | 11/2006 | Hughes | 717/101 |
| 2006/0251073 A1 | 11/2006 | Lepel et al. | 370/392 |
| 2006/0265188 A1* | 11/2006 | French et al. | 702/186 |
| 2007/0100712 A1 | 5/2007 | Kilpatrick et al. | 705/29 |
| 2007/0112879 A1 | 5/2007 | Sengupta | 1/1 |
| 2007/0174023 A1* | 7/2007 | Bassin et al. | 702/186 |
| 2007/0234294 A1 | 10/2007 | Gooding | 717/124 |
| 2007/0283325 A1 | 12/2007 | Kumar | 717/122 |
| 2007/0283417 A1 | 12/2007 | Smolen et al. | 726/2 |
| 2007/0300204 A1 | 12/2007 | Andreev et al. | 717/104 |
| 2008/0010543 A1* | 1/2008 | Yamamoto et al. | 714/38 |
| 2008/0052707 A1 | 2/2008 | Wassel et al. | 717/124 |
| 2008/0072328 A1 | 3/2008 | Walia et al. | 726/25 |
| 2008/0092108 A1 | 4/2008 | Corral | 717/101 |
| 2008/0092120 A1* | 4/2008 | Udupa et al. | 717/124 |
| 2008/0104096 A1 | 5/2008 | Doval et al. | 1/1 |
| 2008/0162995 A1 | 7/2008 | Browne et al. | 714/26 |
| 2008/0178145 A1 | 7/2008 | Lindley | 717/102 |
| 2008/0201611 A1* | 8/2008 | Bassin et al. | 714/37 |
| 2008/0201612 A1* | 8/2008 | Bassin et al. | 714/38 |
| 2008/0255693 A1 | 10/2008 | Chaar et al. | 700/97 |
| 2009/0070734 A1 | 3/2009 | Dixon et al. | 717/102 |
| 2010/0005444 A1 | 1/2010 | McPeak | 717/100 |
| 2010/0145929 A1 | 6/2010 | Burger et al. | 707/713 |
| 2010/0211957 A1 | 8/2010 | Lotlikar et al. | 718/104 |
| 2010/0275263 A1 | 10/2010 | Bennett et al. | 726/26 |
| 2010/0332274 A1 | 12/2010 | Cox et al. | 705/326 |
| 2011/0296371 A1* | 12/2011 | Marella | 717/101 |
| 2012/0017195 A1* | 1/2012 | Kaulgud et al. | 717/101 |
| 2012/0053986 A1 | 3/2012 | Cardno et al. | 705/7.29 |

OTHER PUBLICATIONS

'Comparing the Effectiveness of Software Testing Strategies' by Victor R. Basili et al., IEEE Transactions on Software Engineering, vol. SE-13, No. 12, Dec. 1987.*

Office Action dated Nov. 5, 2012 in U.S. Appl. No. 12/558,274, 12 pages.

Office Action dated Nov. 8, 2012 in U.S. Appl. No. 12/558,260, 17 pages.

Office Action dated Dec. 20, 2012 in U.S. Appl. No. 12/558,147, 18 pages.

Office Action dated Nov. 8, 2012 in U.S. Appl. No. 13/595,148, 14 pages.

McGarry, J. et al., "Practical Software Measurement: A Guide to Objective Program Insight", http://pdf.aminer.org/000/361/576/practical_software_measurement.pdf, Naval Undersea Warfare Center, Version 2.1, Part 1 to Part 4, 1996, 299 pages.

Jonsson, G., "A Case Study into the Effects of Software Process Improvement on Product Quality", Jun. 2004, Master's Tesis in Computer Science—University of Iceland, 93 pages.

Office Action dated Oct. 11, 2012 in U.S. Appl. No. 12/558,327, 12 pages.

Notice of Allowance dated Aug. 31, 2012 in U.S. Appl. No. 12/558,375, 16 pages.

Hurlbut, "Managing Domain Architecture Evolution Through Adaptive Use Case and Business Rule Models", 1997, pp. 1-42.

Office Action dated Oct. 5, 2012 in U.S. Appl. No. 12/557,816, 13 pages.

Holden, I. et al., "Imporoving Testing Efficiency using Cumulative Test Analysis", Proceedings of the Testing: Academic & Idustrial conference—Practice and Research Techniques, IEEE, 2006, pp. 1-5.

Holden, I., "Improving Testing Efficiency using Cumulative Test Analysis", 2006, 25 slices, retrieved from http://www2006.taicpart.org/presentations/session5/3.pdf, pp. 1-25.

Ponaraseri, S. et al., "Using the Planning Game for Test Case Prioritization", retrieved from http:selab.fbk.eu/tonella/papers/issre2008.pdf, pp. 1-10.

Tonella, P., "Publication List", 2012, retrieved from http://selab.fbk.eu/tonella/papersbyyear.html, 15 pages.

Office Action dated Oct. 3, 2012 in U.S. Appl. No. 12/558,382, 11 pages.

Office Action dated Dec. 7, 2012 in U.S. Appl. No. 12/558,324, 15 pages.

Office Action dated Apr. 13, 2012 in U.S. Appl. No. 12/558,324, 10 pages.

Office Action dated Apr. 27, 2012 in U.S. Appl. No. 12/558,375, 10 pages.

Office Action dated Nov. 23, 2012 in U.S. Appl. No. 12/558,263, 36 pages.

Kwinkelenberg, R. et al., "Smartesting for Dummies", Oct. 14, 2008, Wiley, 36 pages.

Lazic, L. et al., "Cost Effective Software Test Metrics", WSEAS Transactions on Computers, Issue 6, vol. 7, Jun. 2008, pp. 559-619.

Hou, R. et al., Optimal Release Times for Software Systems with Scheduled Delivery Time Based on the HGDM, IEEE Transactions on Computers, vol. 46, No. 2, Feb. 1997, pp. 216-221.

Notice of Allowance in related U.S. Appl. No. 12/557,816 dated Jun. 14, 2013, 6 pages.

Notice of Allowance in related U.S. Appl. No. 12/558,327 dated Jun. 24, 2013, 6 pages.

Final Office Action in related U.S. Appl. No. 12/558,324 dated Jul. 18, 2013, 15 pages.

Final Office Action in related U.S. Appl. No. 12/558,382 dated Jul. 31, 2013, 13 pages.

Notice of Allowance in related U.S. Appl. No. 13/595,148 dated Sep. 9, 2013, 14 pages.

Notice of Allowance dated Apr. 15, 2013 in related U.S. Appl. No. 12/558,274, 20 pages.

Final Office Action dated Apr. 3, 2013 in related U.S. Appl. No. 12/558,327, 11 pages.

Final Office Action dated May 13, 2013 in related U.S. Appl. No. 12/558,382, 12 pages.

Notice of Allowance dated Apr. 26, 2013 in related U.S. Appl. No. 12/558,260, 9 pages.

Final Office Action dated Mar. 29, 2013 in related U.S. Appl. No. 12/558,263, 54 pages.

Ulrich, "Test Case Dependency Processing in Robot Framework", https://groups.google.com/forum/?fromgroups#!topic/robotframework-users/twcycBNLXI4, Google, Feb. 16, 2009, pp. 1-4.

Final Office Action dated Mar. 28, 2013 in related U.S. Appl. No. 12/557,816, 14 pages.

Notice of Allowance dated Apr. 2, 2013 in related U.S. Appl. No. 12/558,147, 10 pages.

Final Office Action dated Jun. 13, 2013 in related U.S. Appl. No. 13/595,148, 8 pages.

Chan et al., "A Tool to Support Perspective Based Approach to Software Code Inspection", Proceedings of the 2005 Australian Software Engineering Conference, IEEE, 2005, 8 pages.

Notice of Allowance dated Oct. 15, 2013 in related U.S. Appl. No. 12/558,382, 9 pages.

Notice of Allowance dated Sep. 24, 2013 in related U.S. Appl. No. 13/902,034, 8 pages.

* cited by examiner

FIG. 4B

| ○ INPUT BY NUMBER TOTAL DEFECT:3558 — 410 | ACTIVITY DEFINITION ⓐ<br>× SYSTEM TEST | | | ACTIVITY DEFINITION ⓐ<br>× SYSTEM INTEGRATION TEST | | | ACTIVITY DEFINITION ⓐ<br>× PERFORMANCE TEST | | | ACTIVITY DEFINITION ⓐ<br>× USER ACCEPTANCE TEST | | | FIELD |
|---|---|---|---|---|---|---|---|---|---|---|---|---|---|
| | EFP % [55] 8 7-45 | EFF PD 28288.8 2263.11 | DDF ✹ 2281 ☐0 | EFP % [20] 8 7-45 | EFF PD 10288.8 822.95 | DDF ✹ 140 ☐0 | EFP % [3] | EFF PD 1543.03 | DDF ✹ 57 | EFP % [8] ☐10 9-40 | EFF PD 4114.74 411.47 | DDF ✹ 50 ☐0 | 210 (5.90%) ☐0 |
| ☑ | | | | ☑ | | | ☐ | | | ☐ | | | ☐ 34 |
| ☐ | | | | ☐ | | | ☐ | | | ☐ | | | ☐ 3 |
| ☐ | | | | ☐ | | | ☐ | | | ☐ | | | ☐ 8 |
| ☐ | | | | ☐ | | | ☐ | | | ☐ | | | ☐ 21 |
| ☐ | | | | ☐ | | | ☐ | | | ☐ | | | ☐ 16 |
| ☐ | | | | ☐ | | | ☐ | | | ☐ | | | ☐ 2 |
| ☐ | | | | ☐ | | | ☐ | | | ☐ | | | ☐ 0 |
| ☐ | | | | ☐ | | | ☐ | | | ☐ | | | ☐ 0 |
| ☑ 55-93 [58] | 16407.5 | 572 | ☑ 55-93 [58] | 5968.37 | 23 | ☑ 0-100 [60] | 925.92 | 6 | ☑ 40-91 [47] | 1933.93 | 4 | ☐ 48 |
| ☑ 0-30 [28] | 7920.87 | 1543 | ☑ 0-30 [28] | 2880.32 | 58 | ☐ | | | ☑ 0-68 [35] | 1440.16 | 16 | ☐ 0 |
| ☑ 0-2 [1] | 282.89 | 47 | ☑ 0-2 [1] | 102.87 | 17 | ☐ | | | ☑ 0-2 [1] | 41.15 | 7 | ☐ 18 |
| ☑ 0-6 [5] | 1414.44 | 119 | ☑ 0-6 [5] | 514.34 | -41 | ☐ | | | ☑ 0-7 [5] | 205.74 | 17 | ☐ 0 |
| ☐ | | | | ☐ | | | ☐ | | | ☑ 0-2 [1] | 41.15 | 8 | ☐ 0 |
| ☐ | | | | ☐ | | | ☑ 20-40 [40] | 617.21 | 52 | ☑ 0-2 [1] | 41.15 | 3 | ☐ 26 |
| ☐ | | | | ☐ | | | ☐ | | | ☐ | | | ☐ 0 |
| ☐ | | | | ☐ | | | ☐ | | | ☐ | | | ☐ 25 |
| ☐ | | | | ☐ | | | ☐ | | | ☐ | | | ☐ 0 |
| 100.00% | | | | 100.00% | | | 100.00% | | | 100.00% | | | |

FIG. 10

1000 — MACRO ACTIVITY WORKSPACE

FOLD MATRIX TABLE

[ GENERATE CHART ] [ SAVE AS PROJECT TEMPLATE ]
[ DISCARD CHANGE ] [ SAVE MATRIX ] [ ESTIMATE DEFECT ] [ + SHOW ADVANCED FEATURES ]

1025 TEST ACTIVITIES (100.00%) ● INPUT BY PERCENTAGE TOTAL EFFORT: 1890.63 PD, ○ INPUT BY NUMBER TOTAL DEFECT 2368 — 1010

| ACTIVITY DEFINITION | ACTIVITY DEFINITION ✕ HIGH LEVEL REQS/ DESIGN REVIEW | ACTIVITY 1030 DEFINITION ✕ DETAILED REQS/ DESIGN REVIEW | ACTIVITY DEFINITION ✕ CODE INSPECTION | ACTIVITY DEFINITION ✕ UNIT TEST 1035 | ACTIVITY DEFINITION ✕ SYSTEM TEST | ACTIVITY DEFINITION ✕ SYSTEM INTEGRATION TEST | ACTIVITY DEFINITION ✕ USER ACCEPTANCE TEST | FIELD |
|---|---|---|---|---|---|---|---|---|
| 1020 TRIGGERS 1015 1065 | EFF % 75.63 PD 92-100 ☒ 4 | EFF % 18.91 PD 77-100 ☒ 79 | EFF % 13.44 PD 20-20 ☒ 20 | EFF % 13.44 PD 6 | EFF % 1039.35 PD 55 | EFF % 378.13 PD 20 ☒ 8 | EFF % 151.25 PD 8 ☒ 10 | 66 (2.79%) |
| DESIGN CONFORM | ☒ 72.6 | ☒ 14.94 | ☒ 22.69 | | ☒ 7-45 ☒ 83.19 | ☒ 7-45 ☒ 30.25 | ☒ 9-60 ☒ 15.13 | ☐ |
| LOGIC FLOW | ☐ | ☒ 20-20 ☐ | ☒ 80-80 ☒ 90.75 | ☐ 1050 | ☐ | ☐ | ☐ | 1 |
| CONCURRENCY | ☐ | ☐ 1040 | ☐ | ☐ 1055 | ☐ | ☐ | ☐ | 1 |
| BACKWARD COMPATIBILITY | ☒ 0-2 ☐ 0.76 | ☒ 0-2 ☐ 1 | ☐ | ☒ | ☒ | ☒ | ☒ | 3 |
| LATERAL COMPATIBILITY | ☒ 0-5 ☐ 2.27 | ☐ | ☐ 1045 | ☐ | ☐ | ☐ | ☐ | 0 |
| SIDE EFFECTS | ☐ | ☐ | ☐ 0.19 | ☐ | ☐ | ☐ | ☐ | 0 |
| RARE SITUATIONS | ☐ | ☐ | ☐ | ☐ | ☐ | ☐ | ☐ | 0 |
| LANGUAGE DEPENDENCY | ☐ | ☐ | ☐ | ☐ | ☒ 5.67 | ☐ | ☐ | 0 |
| SIMPLE PATH | ☐ | ☐ | ☐ | ☒ 95-95 ☒ 107.77 | ☐ | ☐ | ☐ | 0 |
| COMPLEX PATH | ☐ | ☐ | ☐ | ☒ 5-5 ☒ 5 | ☐ | ☐ | ☐ | 0 |
| COVERAGE | ☐ | ☐ | ☐ | ☐ | ☒ 55-83 ☒ 603.11 | ☒ 55-83 ☒ 219.31 | ☒ 40-91 ☒ 71.09 | 0 |
| VARIATION | ☐ | ☐ | ☐ | ☐ | ☒ 0-30 ☒ 291.16 | ☒ 0-30 ☒ 105.88 | ☒ 0-38 ☒ 52.04 | 0 |

TEST ACTIVITIES (100.00%) ○ INPUT BY PERCENTAGE TOTAL EFFORT: 5143424 PD

| ACTIVITY DEFINITION | ACTIVITY DEFINITION ⊘ ✕ HIGH LEVEL REQS/ DESIGN REVIEW | | | ACTIVITY DEFINITION ⊘ ✕ DETAILED REQS/ DESIGN REVIEW | | | ACTIVITY DEFINITION ⊘ ✕ CODE INSPECTION | | | ACTIVITY DEFINITION ⊘ ✕ UNIT TEST | | | ACT ✕ |
|---|---|---|---|---|---|---|---|---|---|---|---|---|---|
| TRIGGERS | EFP % | EFF PD 2057.37 | DDF ☀ 254 | EFP % | EFF PD 514.34 | DDF ☀ 16 | EFP % | EFF PD 1543.03 | DDF ☀ 104 | EFP % | EFF PD 3086.05 | DDF ☀ 446 | EFF % |
| | ☑ 98 92-100 | | 247 | ☑ 1 77-100 | | 7 | ☑ 3 20-20 | | 0 | ☑ 6 35-95 | | 407 | ☑ |
| DESIGN CONFORM | | 1975.07 | | | 406.33 | | ☑ 20-20 80-80 | 308.61 | | ☑ 5-5 | 2931.75 | 30 | |
| LOGIC FLOW | ☐ | | | ☐ | | | ☐ | | | ☐ | | | ☐ 55% |
| CONCURRENCY | ☐ | | | ☐ | | | ☐ | | | ☐ | | | ☐ 0-2 |
| BACKWARD COMPATIBILITY | ☑ 0-2 1 | 20.57 | 2 | ☑ 0-2 1 | | 0 | ☐ | 1234.42 | 104 | ☐ | 154.3 | | ☐ |
| LATERAL COMPATIBILITY | ☑ 0-6 3 | 61.72 | 5 | ☐ | 5.14 | 5 | ☐ | | | ☐ | | | ☐ |
| SIDE EFFECTS | ☐ | | | ☐ | | | ☐ | | | ☐ | | | ☐ |
| RARE SITUATIONS | ☐ | | | ☐ | | | ☐ | | | ☐ | | | ☐ |
| LANGUAGE DEPENDENCY | ☐ | | | ☐ | | | ☐ | | | ☐ | | | ☐ |
| SIMPLE PATH | ☐ | | | ☐ | | | ☐ | | | ☐ | | | ☐ |
| COMPLEX PATH | ☐ | | | ☐ | | | ☐ | | | ☐ | | | ☐ |
| COVERAGE | ☐ | | | ☐ | | | ☐ | | | ☐ | | | ☐ |
| VARIATION | ☐ | | | ☐ | | | ☐ | | | ☐ | | | ☐ |
| SEQUENCE | ☐ | | | ☐ | | | ☐ | | | ☐ | | | ☐ |
| INTERACTION | ☐ | | | ☐ | | | ☐ | | | ☐ | | | ☐ |
| SOFTWARE CONFIGURATION | ☐ | | | ☐ | | | ☐ | | | ☐ | | | ☐ |
| HARDWARE CONFIGURATION | ☐ | | | ☐ | | | ☐ | | | ☐ | | | ☐ |
| WORKLOAD/STRESS | ☐ | | | ☐ | | | ☐ | | | ☐ | | | ☐ |
| START/RESTART | ☐ | | | ☐ | | | ☐ | | | ☐ | | | ☐ |
| RECOVERY/EXCEPTION | ☐ | | | ☐ | | | ☐ | | | ☐ | | | ☐ |
| BLOCKED TEST | ☐ | | | ☐ | | | ☐ | | | ☐ | | | ☐ |
| TOTAL | 100.00% | | | 100.00% | | | 100.00% | | | 100.00% | | | 100.00% |

| ACTIVITY DEFINITION | | TEST ACTIVITIES (100.00%) ⊙ INPUT BY PERCENTAGE TOTAL EFFORT: 1890.63 PD ○ INPUT BY NUMBER TOTAL DEFECT: 2368 | | | | | | | | | | | | | |
|---|---|---|---|---|---|---|---|---|---|---|---|---|---|---|---|
| | | ACTIVITY DEFINITION ⊙ | | ACTIVITY DEFINITION ⊙ | | ACTIVITY DEFINITION ⊙ | | ACTIVITY DEFINITION ⊙ | | ACTIVITY DEFINITION ⊙ | | ACTIVITY DEFINITION ⊙ | | ACTIVITY DEFINITION ⊙ | |
| | | × HIGH LEVEL REQS/ DESIGN REVIEW | | × DETAILED REQS/ DESIGN REVIEW | | × CODE INSPECTION | | × UNIT TEST | | × SYSTEM TEST | | × SYSTEM INTEGRATION | | × USER ACCEPTANCE TEST | FIELD |
| TRIGGERS | | DDF 143 ✱ | | DDF 34 ✱ | | DDF 97 ✱ | | DDF 133 | | DDF 1582 | | DDF 89 | | DDF 16 | 66 (2.79%) |
| DESIGN CONFORM | ☒ | 145 | ☒ | 30 | ☒ | 45 | ☐ | | ☐ | 20 | ☐ | 1 | ☐ | 0 | 0 |
| LOGIC FLOW | ☐ | 1 | ☐ | 3 | ☒ | 52 | ☐ | | ☐ | | ☐ | | ☐ | | 1 |
| CONCURRENCY | ☐ | | ☐ | | ☐ | | ☐ | | ☐ | | ☐ | | ☐ | | 0 |
| BACKWARD COMPATIBILITY | ☒ | | ☐ | | ☒ | | ☐ | | ☐ | | ☐ | | ☐ | | 1 |
| LATERAL COMPATIBILITY | ☒ | 2 | ☐ | 0 | ☒ | | ☐ | | ☐ | | ☐ | | ☐ | | 0 |
| SIDE EFFECTS | ☐ | | ☐ | | ☐ | | ☐ | | ☐ | | ☐ | | ☐ | | 3 |
| RARE SITUATIONS | ☐ | | ☐ | | ☐ | | ☐ | | ☐ | | ☐ | | ☐ | | 0 |
| LANGUAGE DEPENDENCY | ☐ | | ☐ | | ☐ | | ☒ | 126 | ☐ | | ☐ | | ☐ | | 0 |
| SIMPLE PATH | ☐ | | ☐ | | ☐ | | ☒ | 7 | ☐ | | ☐ | | ☐ | | 0 |
| COMPLEX PATH | ☐ | | ☐ | | ☐ | | ☐ | | ☐ | | ☐ | | ☐ | | 0 |
| COVERAGE | ☐ | | ☐ | | ☐ | | ☐ | | ☒ | 926 | ☒ | 26 | ☐ | 1 | 8 |
| VARIATION | ☐ | | ☐ | | ☐ | | ☐ | | ☒ | 563 | ☒ | 16 | ☐ | 1 | 0 |
| SEQUENCE | ☐ | | ☐ | | ☐ | | ☐ | | ☒ | 21 | ☒ | 8 | ☐ | 3 | 4 |
| INTERACTION | ☐ | | ☐ | | ☐ | | ☐ | | ☒ | 52 | ☒ | 19 | ☐ | 8 | 25 |
| SOFTWARE CONFIGURATION | ☐ | | ☐ | | ☐ | | ☐ | | ☐ | | ☐ | | ☐ | 2 | 0 |
| HARDWARE CONFIGURATION | ☐ | | ☐ | | ☐ | | ☐ | | ☐ | | ☐ | | ☐ | 2 | 1 |
| WORKLOAD/STRESS | ☐ | | ☐ | | ☐ | | ☐ | | ☐ | | ☐ | | ☐ | | 11 |
| START/RESTART | ☐ | | ☐ | | ☐ | | ☐ | | ☐ | | ☐ | | ☐ | | 0 |
| RECOVERY/EXCEPTION | ☐ | | ☐ | | ☐ | | ☐ | | ☐ | | ☐ | | ☐ | | 0 |
| BLOCKED TEST | ☐ | | ☐ | | ☐ | | ☐ | | ☐ | | ☐ | | ☐ | | 0 |
| TOTAL | | 100.00% | | 100.00% | | 100.00% | | 100.00% | | 100.00% | | 100.00% | | 100.00% | |

FIG. 20 ns in the art to overcome the limitations described herein above.

SYSTEM AND METHOD FOR ANALYZING ALTERNATIVES IN TEST PLANS

CROSS REFERENCE TO RELATED APPLICATIONS

The present invention is related to co-pending application Ser. Nos. 12/558,327, 12/558,260, and 12/558,263, the contents of which are incorporated herein by reference in their entireties.

FIELD OF THE INVENTION

The present invention generally relates to project test planning, and more particularly, to a method and system to analyze alternatives in test plans.

BACKGROUND

While software systems continue to grow in size and complexity, business demands continue to require shorter development cycles. This has led some software developers to compromise on functionality, time to market, and quality of software products. Furthermore, the increased schedule pressures and limited availability of resources and skilled labor can lead to problems such as incomplete design of software products, inefficient testing, poor quality, high development and maintenance costs, and the like. This may lead to poor customer satisfaction and a loss of market share for companies developing software and other products.

To improve product quality, many organizations devote an increasing share of their resources to testing and identifying problem areas related to software and the process of software development. Accordingly, it is not unusual to include a quality assurance team in software development projects to identify defects in the software product during and after development of a software product. By identifying and resolving defects before marketing the product to customers, software developers can assure customers of the reliability of their products, and reduce the occurrence of post-sale software fixes such as patches and upgrades which may frustrate their customers.

Testing and identifying problem areas related to software development may occur at different points or stages in a software development lifecycle. For example, a general software development lifecycle includes a high level requirements/design review, a detailed requirements/design review, code inspection, unit test, system test, system integration test, potentially a performance test, and typically, a user acceptance test. Moreover, as the software development lifecycle proceeds from high level requirements/design review to user acceptance test, costs for detecting and remedying software defects generally increases, e.g., exponentially.

Conventional test planning tools and methods do not provide a mechanism to model alternative test scenario planning for the purposes of comparing them and determining the optimal balance of cost, risk, quality and schedule. As a result, alternative test planning typically is not performed by most projects since it is largely a manual task and too labor intensive to be delivered in real time for projects to benefit from the information.

There are commonly at least three unique perspectives in test projects, e.g., the test team perspective, the development team perspective, and the overall project stakeholder perspective. An optimal test plan is typically a result of input from at least each of these perspectives, taking into consideration multiple factors. Because there are multiple perspectives involved in designing test plans, it can be difficult to adequately model alternative test approaches so that the optimal mix of cost, quality, risk, and schedule can be achieved. Conventional models are based on the assumption that test planning input will come from a single unified perspective, and therefore tend to be too general and simplistic to be of significant value. Furthermore, conventional test planning tools do not provide any mechanism to perform analysis of alternative test plans, e.g., 'what-if' analysis.

As a result, alternative test planning typically is not performed by most projects since it is largely a manual task and too labor intensive to be delivered in a timely way for projects to benefit from the information. As such, many projects opt not to perform alternatives analysis, and instead execute a test plan that is significantly more costly, less efficient, and higher risk than could have been achieved because they were unaware a better alternative existed.

Accordingly, there exists a need in the art to overcome the deficiencies and limitations described herein above.

SUMMARY

In a first aspect of the invention, there is a method implemented in a computer infrastructure. The computer infrastructure has computer executable code tangibly embodied on a computer readable storage medium having programming instructions operable to: create an initial test plan including initial estimates of effort and defect distributions; create an alternative test plan including alternative estimates of effort and defect distributions; and display at least one metric of the initial test plan and the alternative test plan side by side for comparison by a user.

In another aspect of the invention, a system comprising a test planning optimization workbench including a processor, a memory, and a defect projection engine operable to estimate an effort distribution and a defect distribution for an initial test plan and an alternative test plan. The system also includes a schedule generation engine operable to generate a schedule for the initial test plan and the alternative test plan, a cost calculation engine operable to determine a cost of the initial test plan and the alternative test plan, and a dashboard operable to display at least one aspect of the initial test plan and the alternative test plan for comparison by a user.

In an additional aspect of the invention, there is a computer program product comprising a computer usable storage medium having readable program code embodied in the storage medium. When executed on a computing device, the program code causes the computing device to: receive initial input data from a user; create an initial test plan including initial estimates of effort and defect distributions based on the initial input data; receive alternative input data from a user; create an alternative test plan including alternative estimates of effort and defect distributions based on the alternative input data; and display at least one metric of the initial test plan and the alternative test plan side by side for comparison by a user.

In a further aspect of the invention, there is a computer system for providing an alternatives analysis for a test plan. The system comprises: a processor, a computer readable memory, and a computer readable storage media; first program instructions to estimate an effort distribution and a defect distribution for an initial test plan and an alternative test plan; second program instructions to generate a schedule for the initial test plan and the alternative test plan; third program instructions to determine a cost of the initial test plan and the alternative test plan; and fourth program instructions to display at least one aspect of the initial test plan and the alternative test plan for comparison by a user. The first, second, third, and fourth program instructions are stored on the computer readable storage media for execution by the processor via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 4A and 4B show an exemplary user interface and underlying functionality in accordance with aspects of the invention;

FIGS. 7-20 show exemplary user interfaces and underlying functionality in accordance with aspects of the invention;

DETAILED DESCRIPTION

Figure 1:
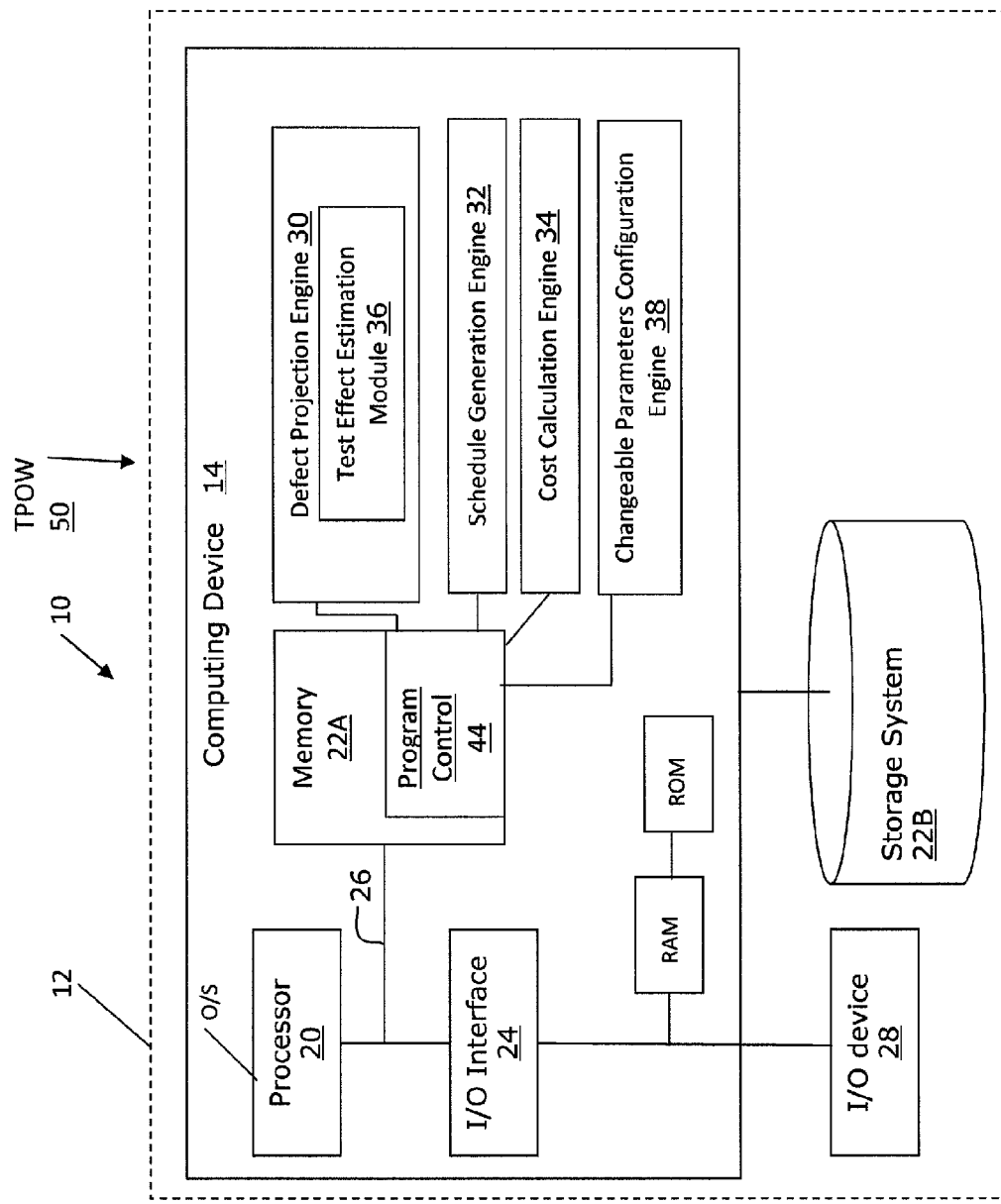
FIGS. 1 and 2 show illustrative environments for implementing the steps in accordance with aspects of the invention.

The present invention generally relates to project test planning, and more particularly, to a method and system to analyze alternatives in test plans. In accordance with aspects of the invention, a planning tool and method are provided that provide a user with a ability to create and compare different test plans. In embodiments, an initial test plan is created based on an initial set of input data. Moreover, an alternative test plan is created based on an alternative set of input data. In embodiments, the initial and alternative test plans are compared based on metrics including: test process (effort allocation) and total devoted test effort; discovered defects by triggers in each activity and residual defects; testing cost, defect fix cost, and business cost; and schedule in terms of project duration and each test activity duration by teams. In this manner, implementations of the invention provide the ability to perform a what-if analysis in test plans for test projects.

In accordance with aspects of the invention, a model is used to project different alternative test plan scenarios in a way that incorporates and reflects multiple perspectives and goals, and can be dynamically updated when project assumptions change over time. In embodiments, the model used for performing the alternatives analysis includes test planning deliverables such as test process and effort allocation, test effect estimation, and test schedule. More specifically, in embodiments, a user can make adjustments in key variables to produce alternative outcomes, and can compare the alternative outcomes to perform a what-if analysis from any of the test cost perspective, the defect fix cost and residual defect cost perspective, and the market cost perspective.

More specifically, implementations of the invention may be used to analyze test plan alternatives based on test process and effort allocation to provide 'what-if' analysis from a test cost perspective. Additionally, implementations of the invention may be used to analyze test plan alternatives based on test effect estimation to provide 'what-if' analysis from a defect fix cost and the residual defect cost perspective. Additionally, implementations of the invention may be used to analyze test plan alternatives based on test schedule to provide 'what-if' analysis from a market cost perspective. In embodiments, the model is designed for dynamic updating so that as project conditions change, the 'what-if' scenarios adapt accordingly. In this manner, implementations of the invention provide standardized alternatives analysis in a highly automated and dynamically updatable way, making it cost effective to perform.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1). In embodiments, the environment 10 may be designated as a test planning optimization workbench (TPOW) 50.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc. In embodiments, the test effort, defect, and cost estimating information may be stored in storage system 22B or another storage system, which may be, for example, a database.

In general, the processor 20 executes computer program code (e.g., program control 44), which can be stored in the memory 22A and/or storage system 22B. Moreover, in accordance with aspects of the invention, a program control 44 controls a defect projection engine 30, schedule generation engine 32, cost calculation engine 34, and changeable parameters configuration engine 38, described in greater detail herein. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the computing device 14 includes the defect projection engine 30, schedule generation engine 32, cost calculation engine 34, and changeable parameters configuration engine 38. In accordance with aspects of the invention, the defect projection engine 30 provides functionality to determine an effort distribution and a defect distribution over a matrix of activities and triggers based on input data provided by a user. In further embodiments, the defect projection engine 30 includes a test effect estimation module 36 that provides the functionality of estimating the change in effort distribution and/or defect distribution based on a change to the input data of the model.

In accordance with aspects of the invention, the schedule generation engine 32 provides functionality to determine a test schedule based on the effort distribution, the defect distribution, and resources defined by a user. In accordance with aspects of the invention, the cost calculation engine 34 provides functionality to determine a test costs based on the effort distribution, defect distribution, and cost rules defined by the user. In accordance with aspects of the invention, the changeable parameters configuration engine 38 provides functionality to determine which inputs are changeable according to the status of a current project, and controls aspects of a user interface so that the user can only change appropriate inputs.

The defect projection engine 30, schedule generation engine 32, cost calculation engine 34, and changeable parameters configuration engine 38 may be implemented as one or more program code modules in the program control, and may be stored in memory as separate or combined modules. For example, the defect projection engine 30, schedule generation engine 32, cost calculation engine 34, and changeable parameters configuration engine 38 may comprise and/or utilize at least one of programmed logic, rules, algorithms, and probability tables in performing the processes described herein.

Figure 2:
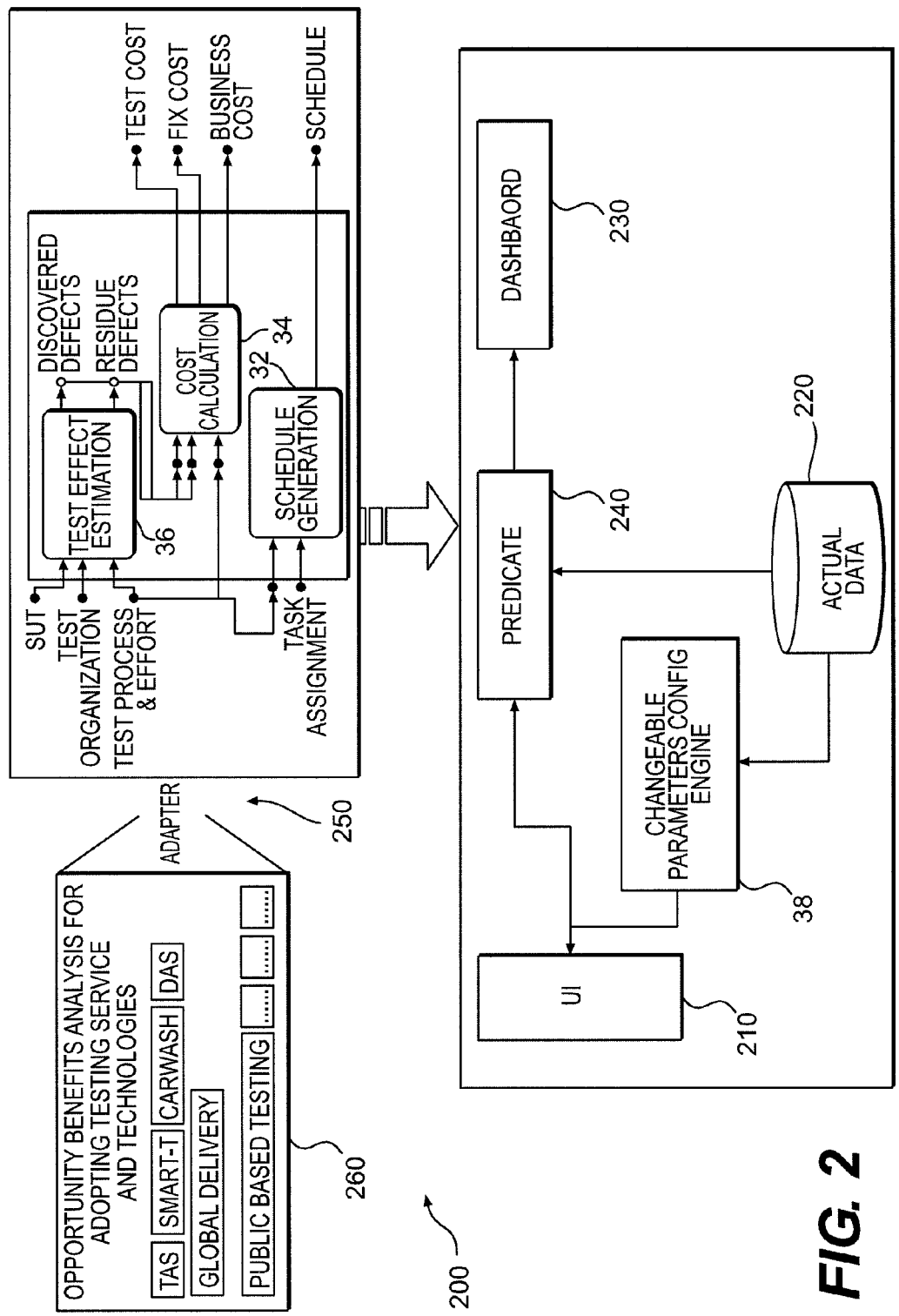

FIG. 2 shows an illustrative architecture for managing the processes in accordance with aspects of the invention. FIG. 2 may also represent a high level flow in accordance with aspects of the invention and may be implemented with or in the environment of FIG. 1. In accordance with aspects of the invention, the architecture depicted in FIG. 2 provides a unified framework to support what-if analysis in test planning. In embodiments, the architecture includes a user interface (UI) 210 that may be employed by a user to adjust the value of inputs and save the current set of inputs' value into a configuration. In embodiments, the inputs of this framework are: the system under testing; testing process and devoted total effort; the testing organization(s); the test task assignment(s); and applied new technologies and services. Although the invention is not limited to these inputs, and any suitable inputs may be used within the scope of the invention. The UI 210 may be implemented via the I/O device 28 described with respect to FIG. 1.

In accordance with aspects of the invention, the architecture 200 also includes a data storage 220. In embodiments, the data storage 220 part of the framework collects the status and data of a current testing project (e.g., initial plan). The data store 220 may be implemented with the storage system 22B described with respect to FIG. 1.

Still referring to FIG. 2, the architecture may additionally include a changeable parameter configuration engine 38 described with respect to FIG. 1. In embodiments, the changeable parameter configuration engine 38 determines which inputs are changeable according to the status of the current project, which in turn controls aspects of the UI 210 so that the UI 210 only accepts user changes in the appropriate (changeable) inputs. The determination of which inputs are changeable may be based on pre-defined rules, logic, and probability tables that are programmed into the TPOW 50.

In accordance with additional aspects of the invention, the architecture 200 also includes a dashboard 230 that shows metrics with different visualization methods so that metrics from different configurations can be shown side by side for easy comparison. The metrics may be, but are not limited to: test process (effort allocation) and total devoted test effort; discovered defects by triggers in each activity and residual defects; testing cost, defect fix cost, and business cost; and schedule in terms of project duration and each test activity duration by teams. In embodiments, the dashboard 230 is implemented as a user interface via the I/O device 28 described with respect to FIG. 1.

The test architecture 200 of FIG. 2 also includes a predicate module 240 that incorporates functionality of the test effect estimation module 36, schedule generation engine 32, and cost calculation engine 34 described with respect to FIG. 1. In accordance with aspects of the invention, the predicate module 240 uses the current value of input to estimate the output metrics for a plan (e.g., a macro plan). More specifically, as described with respect to FIG. 1, the test effect estimation module 36 estimates discovered and residual defect volume, the cost calculation engine 34 calculates the test cost, defect fix cost, and business cost according to the devoted test effort, discovered defects, and residual defects, and the schedule generation engine 32 generates a schedule generation according to the devoted effort and the task assignment.

In additional embodiments, the predicate module 240 optionally comprises an adapter 250 that transfers outputs of optional testing services and/or technology 260 to a set of inputs for the TPOW 50. The optional services 260 provide additional input that may be used by at least one of the test effect estimation module 36, schedule generation engine 32, and cost calculation engine 34 in determining at least one of the test process (effort allocation) and total devoted test effort; discovered defects by triggers in each activity and residual defects; testing cost, defect fix cost, and business cost; and schedule. The services 260 are not critical to the present invention, but rather are optional, and are described herein as providing additional input data upon which the TPOW 50 may estimate values for a test plan.

Structured DRM and ODC

In accordance with aspects of the invention, the TPOW 50 generates defect projections by leveraging aspects of ODC (Orthogonal Defect Classification) and DRM (Defect Reduction Method). More specifically, in embodiments, the TPOW 50 utilizes the "activity" and "trigger" attributes of the ODC/DRM schema, which are as described in commonly assigned co-pending application Ser. Nos. 12/558,327 and 12/558,260, the contents of which are hereby expressly incorporated by reference in their entirety.

Software testing may involve verifying the correctness, completeness, security, quality, etc. of a product. During testing, a technical investigation may be performed by, for example, executing a program or application with the intent to find defects. If defects are found, one or more areas in the software code may be identified based on the defects. Therefore, developers may alter the code in the identified regions to obviate the defect.

ODC is a schema for analyzing defects (e.g., in software related to a project) and focuses on problems with code or documentation. ODC typically is confined to code-related defects, and does not consider the role of a system environment while analyzing such defects. DRM incorporates the schema of ODC while additionally applying a similar approach to defects other than code-related defects (e.g., defects or failures related to and/or caused by system environment).

In the ODC/DRM schema, an "activity" describes one or many defect removal tasks across the entire project life cycle. There are different activities that aim to remove defects in different software development artifacts: requirements, design, code, and documentation. The role of an activity is defined by triggers. Activity, as used in ODC/DRM and the structured DRM model herein, is different from test level (also known as test phase) because one test level/phase can have multiple activities. An activity as used herein may also refer to the actual activity that is being performed at the time the defect is discovered. For example, during the function test phase, one might decide to perform a code inspection. The phase would be function test but the activity is code inspection. While defect removal activities are expected to be tailored from project to project, common activities used across the industry include: High Level Requirements/Design Review (e.g., reviewing design or comparing the documented design against known requirements); Detailed Requirements/Design Review (e.g., reviewing design or comparing the documented design against known requirements); Code Inspection (e.g., examining code or comparing code against the documented design); Unit Test (e.g., 'white box' testing or execution based on detailed knowledge of the code internals); Function Test (e.g., 'black box' execution based on external specifications of functionality); System Test (e.g., Testing or execution of the complete system, in the real environment, requiring all resources); System Integration Test; Performance Test; and User Acceptance Test. The invention is not intended to be limited to these activities; instead, any suitable number and types of activities may be used within the scope of the invention.

In the ODC/DRM schema, a "trigger" describes the environment or condition that exists when a defect appears. For example, when a defect appears during review and inspection activities, personnel map the defect to a trigger by choosing the trigger (e.g., from a predefined list of triggers) that best describes what they were thinking about when they discovered the defect. For example, when a defect appears during a test (e.g., test defects), personnel map the defect to a trigger by matching the trigger (e.g., from the predefined list) that captures the intention behind the test case or the environment or condition that served as catalyst for the failure. For example, there are twenty-one triggers defined in the ODC model, including: Design Conformance; Logic/Flow; Backward Compatibility; Lateral Compatibility; Concurrency; Internal Document; Language Dependency; Side Effect; Rare Situations; Simple Path; Complex Path; Coverage; Variation; Sequencing; Interaction; Workload/Stress; Recovery/Exception; Startup/Restart; Hardware Configuration; Software Configuration; and Blocked Test (previously Normal Mode). The invention is not intended to be limited to these triggers. Instead, any suitable number and types of triggers may be used within the scope of the invention.

In embodiments, the list of triggers used in implementations of the invention is an orthogonal list. As such, any particular defect will only accurately fit within one and only one of the triggers. In other words, each defect is counted once and only once.

In the ODC/DRM schema, triggers are mapped to activities. Table 1 gives an example of an activity to trigger mapping. However, the invention is not limited to this mapping, and any suitable mapping may be used within the scope of the invention. For example, one of the first things an organization typically does once they have decided to implement ODC is to define the activities they perform and map the triggers to those activities. Although the organization defines their activities, the organization typically does not define or redefine the triggers.

TABLE 1

| Activity | Trigger |
| --- | --- |
| Design Review/Code Inspection | Design Conformance |
| | Logic/Flow |
| | Backward Compatibility |
| | Lateral Compatibility |
| | Concurrency |
| | Internal Document |
| | Language Dependency |
| | Side Effect |
| | Rare Situations |
| Unit Test | Simple Path |
| | Complex Path |
| Function Test | Coverage |
| | Variation |
| | Sequencing |
| | Interaction |
| System Test | Workload/Stress |
| | Recovery/Exception |
| | Startup/Restart |
| | Hardware Configuration |
| | Software Configuration |
| | Blocked Test (previously Normal Mode) |

The function test activity, and activities downstream thereof, are often referred to as 'black box' testing, meaning that the manner of testing utilizes only external interfaces just as would be performed by an end-user. The focus on function testing is on the input and ensuring the output or results are as expected. Table 2 defines the triggers that are associated with function testing in accordance with aspects of the invention.

TABLE 2

| Trigger Value | Definition |
| --- | --- |
| Coverage | The test case that found the defect was a straightforward attempt to exercise code for a single function, using no parameters or a single set of parameters. Representative of a very common usage. |
| Variation | The test case that found the defect was a straightforward attempt to exercise code for a single function but using a variety of inputs and parameters. These might include invalid parameters, extreme values, boundary conditions, and combinations of parameters. |
| Sequencing | The test case that found the defect executed multiple functions in a very specific sequence. This trigger is only chosen when each function executes successfully when run independently, but fails in this specific sequence. It may also be possible to execute a different sequence successfully. |
| Interaction | The test case that found the defect initiated an interaction among two or more bodies of code. This trigger is only chosen when each function executes successfully when run independently, but fails in this specific combination. The interaction was more involved than a simple serial sequence of the executions. |

Triggers invoked during System Test are ones that are intended to verify the system behavior under normal conditions, as well as under duress. Table 3 defines the triggers that are associated with system testing in accordance with aspects of the invention.

TABLE 3

| Trigger Value | Definition |
| --- | --- |
| Workload/Stress | The system is operating at or near some resource limit, either upper or lower. Mechanisms for creating this condition include running small or large loads, running a few or many products at a time, letting the system run for an extended period of time. |
| Recovery/Exception | The system is being tested with the intent of invoking an exception handler or some type of recovery code, evaluating the ability of the system to detect an exception condition, report it, but continue to carry on. The defect would not have surfaced if some earlier exception had not caused exception or recovery processing to be invoked. From a field perspective, this trigger would be selected if the defect is in the system's or product's ability to recover from a failure, not the failure itself. |
| Startup/Restart | This trigger is similar to Recovery/Exception in that it was preceded by a serious failure. In this case, the system did not recover, and subsequent Startup or Restart also fails. The system or subsystem was being initialized or restarted following some earlier shutdown or complete system or subsystem failure. |
| Hardware Configuration | Verifying whether various hardware combinations can be installed and are able to communicate with each other and the system. The system is being tested to ensure functions execute correctly under specific hardware configurations. |
| Software Configuration | Verifying whether various software combinations can be installed and are able to communicate with each other and the system. The system is being tested to ensure functions execute correctly under specific software configurations. |

Triggers that are associated with Design Review (e.g., High Level Requirements/Design Review; Detailed Requirements/Design Review) and/or Code Inspection activities do not reflect execution of test cases, but rather capture the focus of the though process during reviews. Table 4 defines the triggers that are associated with function testing in accordance with aspects of the invention.

TABLE 4

| Trigger Value | Definition |
| --- | --- |
| Design Conformance | The document reviewer or the code inspector detects the defect while comparing the design element or code segment being inspected with its specification in the preceding stage(s). This would include design documents, code, development practices and standards, or to ensure design requirements aren't missing or ambiguous. |
| Logic/Flow | The inspector uses knowledge of basic programming practices and standards to examine the flow of logic or data to ensure they are correct and complete. Examining only the code or design, detecting a flaw in the logic or the flow. |
| Backward Compatibility | The inspector uses extensive product/component experience to identify an incompatibility between the function described by the design document or the code, and that of earlier versions of the same product or component. From a field perspective, the customer's application, which ran successfully on the prior release, fails on the current release. Ensuring that the current release of a product is consistent, especially with regard to user interfaces, with prior releases. |
| Lateral Compatibility | The inspector with broad-based experience, detects an incompatibility between the function described by the design document or the code, and the other systems, products, services, components, or modules with which it must interface. Ensuring that the component or system is following defined protocols in terms of interacting successfully with systems or components. |
| Concurrency | The inspector is considering the serialization necessary for controlling a shared resource when the defect is discovered. This would include the serialization of multiple functions, threads, processes, or kernel contexts as well as obtaining and releasing locks. |
| Internal Document | There is incorrect information, inconsistency, or incompleteness within internal documentation. Prologues, code comments, and test plans represent some examples of documentation which would fall under this category. Used when a defect record documents changes requirements or design. |

TABLE 4-continued

| Trigger Value | Definition |
| --- | --- |
| Language Dependency | The developer detects the defect while checking the language specific details of the implementation of a component or a function. Language standards, compilation concerns, and language specific efficiencies are examples of potential areas of concern. Used when implementations of a new, unfamiliar technology or language results in syntax and compile errors. |
| Side Effects | An experienced reviewer detects a problem where within a single module or component, logic is successful, but breaks a dependency with another module, component, or system. |
| Rare Situation | A potential problem that is outside of the documented requirements and design, dealing with unusual configurations and/or usage. Flaws or omissions in error recovery would not be classified as Rare Situation. |

Figure 3:
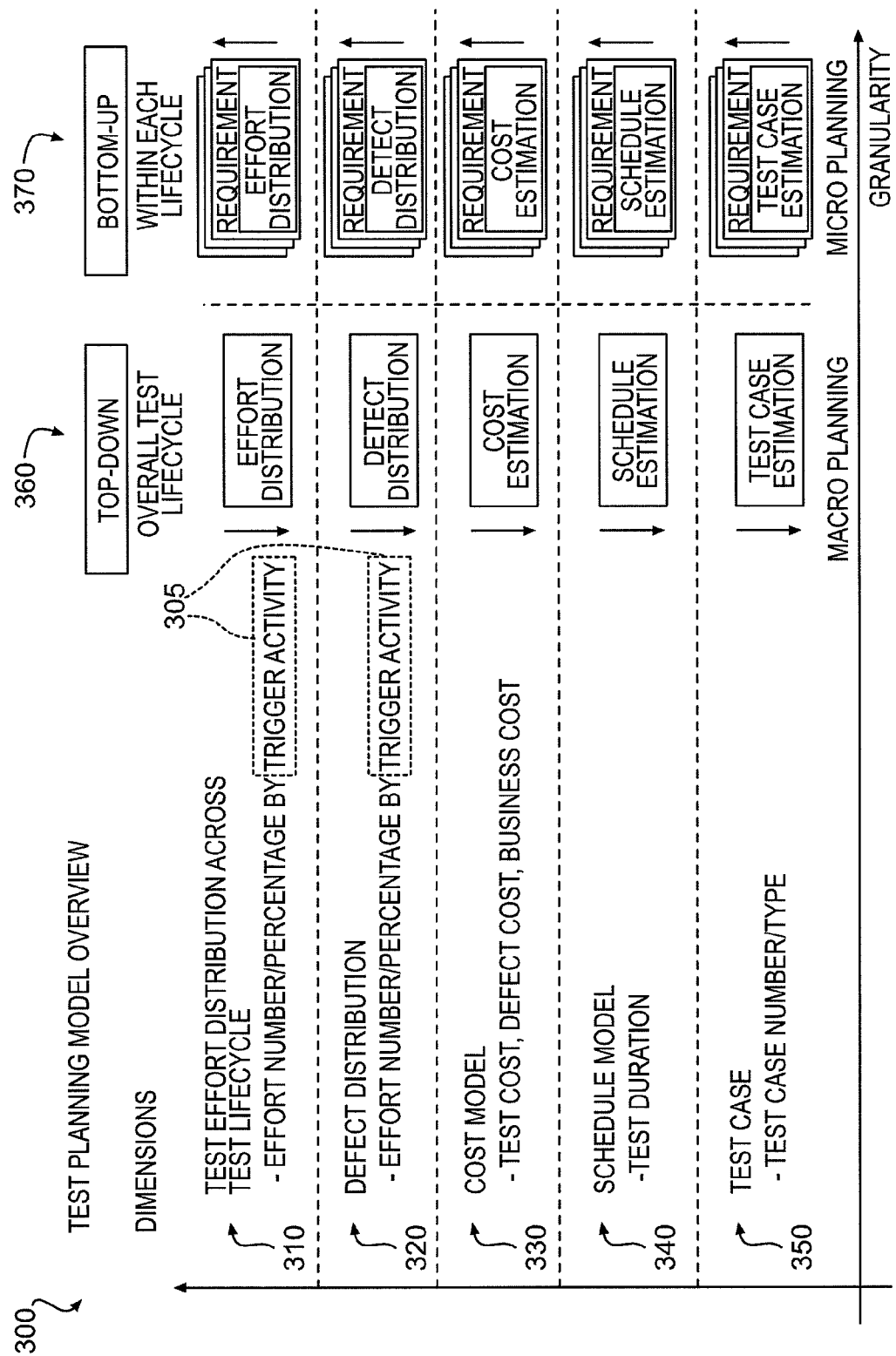
FIG. 3 shows an high level overview of a model in accordance with aspects of the invention.

In accordance with aspects of the invention, the TPOW 50 is based on the "structured DRM model" shown in FIG. 3. In embodiments, the TPOW 50 uses the activity and trigger attributes to estimate test effort and project defect distributions across the entire project life cycle of defect removal activities. As depicted by reference number 305 in FIG. 3, the ODC/DRM activity and trigger attributes are leveraged at a high level with the structured DRM model 300.

In embodiments, the structured DRM model 300 comprises the following dimensions: test effort distribution across the test life cycle 310; defect distribution across the life cycle 320; cost modeling 330; schedule modeling 340; and test case modeling 350. However, the invention is not limited to these dimensions, and any suitable dimensions may be used within the scope of the invention.

In accordance with aspects of the invention, test effort distribution 310 and defect distribution 320 across the life cycle in the structured DRM model 300 can be specified directly or specified as a percentage allocation by trigger/activity of overall test effort and defect counts Effort may be calculated in PD (person days), or any other suitable measure.

In embodiments, cost modeling 330 across the life cycle in the structured DRM model 300 is measured in Test Cost, Defect Cost, and Business Cost. Test cost may represent, for example, the cost induced by defect removal activities, including but not limited to: understanding requirements, test assessment and planning, test design, test execution, defect reporting, retest, test tool acquirement, license costs, etc. Defect cost may represent, for example, the cost induced by defect diagnosis and resolution, and usually comes from developer or other defect resolution team. Business cost may represent, for example, the cost induced by business impact when defects show up in production.

In further embodiments, schedule modeling 340 in the structured DRM model 300 applies scheduling calculations around test duration to derive planning dates. Test Case modeling 350 in the structured DRM model 300 applies standard test case number and/or type calculations to provide test coverage planning information.

In accordance with aspects of the invention, the structured DRM model 300 establishes a relationship between macro planning 360 and micro planning 370 based upon the dimensions 310, 320, 330, 340, and 350. Moreover, the structured DRM model 300 utilizes defect discovery information, which is more accurate than conventional models because it is dependent on data that is available for every defect that can occur, e.g., all defects are included in the structured DRM model 300.

Figure 4A:
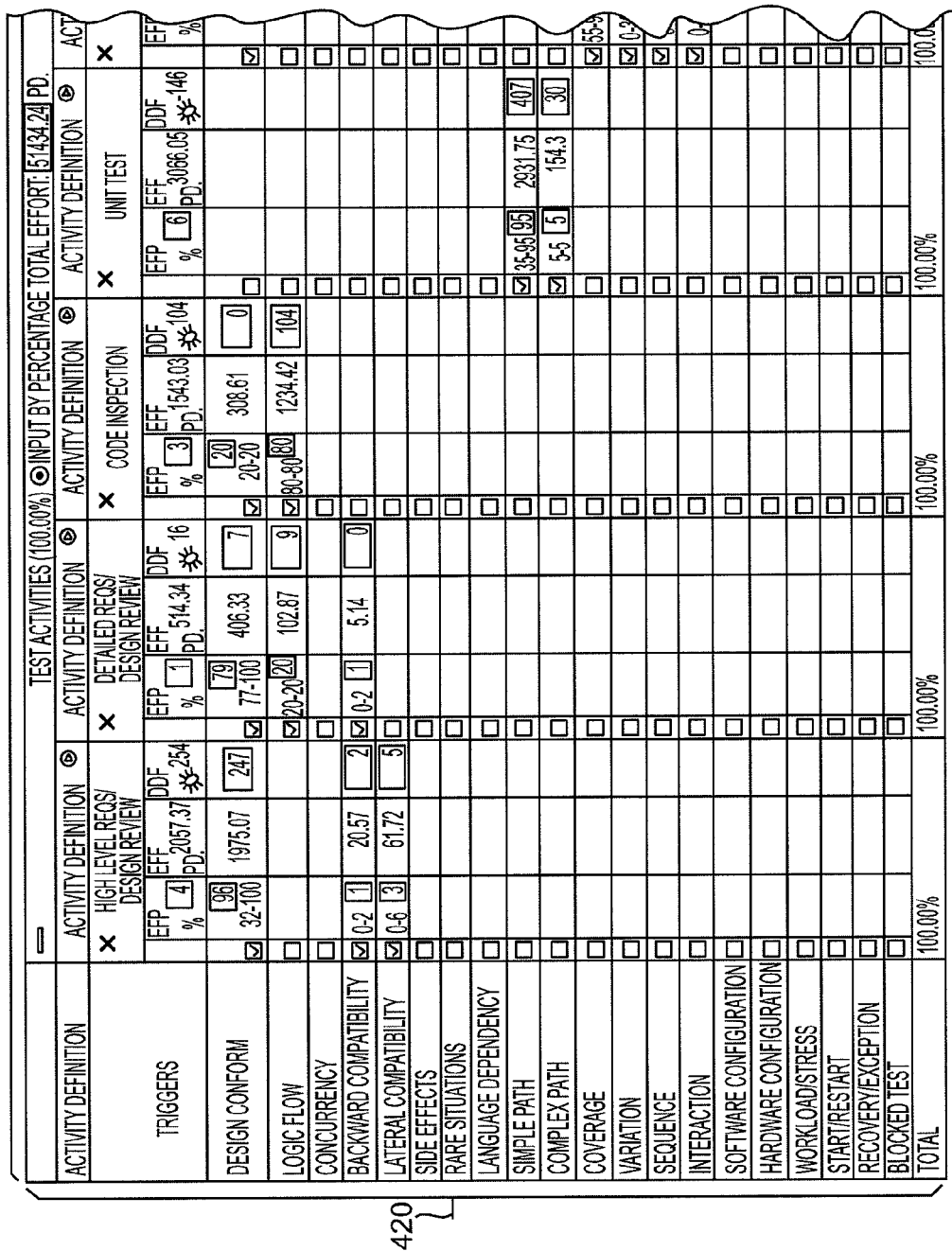

FIGS. 4A and 4B show an exemplary user interface (UI) 400 based on the structured DRM model 300 implemented in the TPOW 50 in accordance with aspects of the invention. The user interface 400, and all other user interfaces described herein, are merely exemplary and are provided for illustrating aspects of the TPOW 50 in accordance with aspects of the invention. The user interfaces described herein are not intended to limit the scope of the invention, and it is understood that other different interfaces may be used in implementations of the invention. The user interfaces described herein may be presented to a user with any suitable I/O device (e.g., I/O device 28 of FIG. 1). More specifically, in FIGS. 4A and 4B, the various ODC/DRM activities 410 are displayed in columns, and the various ODC/DRM triggers 420 are displayed in rows. As illustrated in FIG. 3, the triggers are generally ordered from top to bottom in accordance with when these triggers are experienced in the product development life cycle. Data at an intersection of a particular trigger and particular activity represents an estimation of effort or expected number of defects associated with the particular trigger and activity.

High Level Flow Diagram

Figure 5:
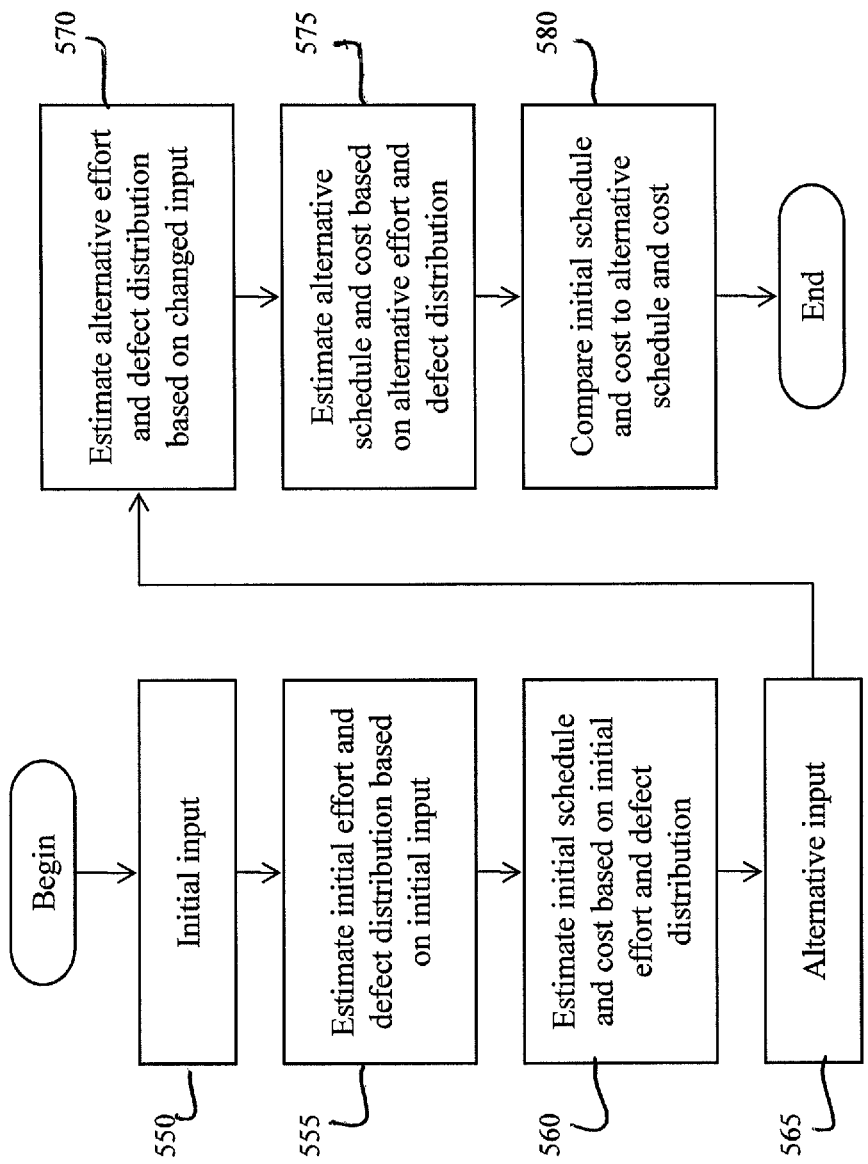
FIG. 5 illustrates a high level flow in accordance with aspects of the invention.

FIG. 5 shows an exemplary high level flow for performing aspects of the present invention. The steps of FIG. 5, and all other flow diagrams herein, may be implemented in the environment of FIGS. 1 and 2, for example. The flow diagrams may equally represent a high-level block diagram or a swim-lane diagram of the invention. The flowchart and/or block diagram in FIG. 5, and other figures herein, illustrates the architecture, functionality, and operation of possible implementations of systems, methods and computer program products according to various embodiments of the present invention. In this regard, each block in the flowchart, block diagram or swim-lane diagram may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

Still referring to FIG. 5, at step 550 an initial input is provided to (e.g., received by) the TPOW 50. In embodiments, the input is provided by a user via a user interface of a computing device of the TPOW 50. In embodiments, the input includes data for generating a test plan, such as a macro-level test plan, and includes, for example, an organizational maturity level and a size of code being tested.

At step 555, the TPOW 50 estimates an initial effort and defect distribution based on input from step 550. In embodiments, the initial effort and defect distribution are generated using the defect projection estimation engine 30, as described in greater detail below. The effort and defect distributions are arranged according to activities and triggers, such as shown in FIG. 3, described above.

At step 560, the TPOW 50 generates an initial test schedule and test cost based on the initial effort and defect distributions from step 555. In embodiments, the test schedule and test cost are determined using the schedule generation engine 32 and cost calculation engine 34. Steps 550, 555, and 560 may collectively be thought of as creating an initial test plan.

At step 565 an alternative input is provided to (e.g., received by) the TPOW 50. In embodiments, the alternative input is provided by a user via a user interface of a computing device of the TPOW 50. In embodiments, the alternative input includes at least one change (e.g., difference) from the initial input from step 450. The change in input data may be provided by a user via the UI 210 and controlled by the changeable parameters configuration engine 38, as described with respect to FIG. 2.

At step 570, the TPOW 50 estimates an alternative effort and defect distribution based on alternative input from step 565. In embodiments, the alternative effort and defect distribution are generated using the defect projection estimation engine 30, and more particularly the test effect estimation engine 36, as described in greater detail herein.

At step 575, the TPOW 50 generates an alternative test schedule and test cost based on the alternative effort and defect distributions from step 470. In embodiments, the test schedule and test cost are determined using the schedule generation engine 32 and cost calculation engine 34. Steps 565, 570, and 575 may collectively be thought of as creating an alternative test plan.

At step 580, the initial test plan and the alternative test plan are compared. In embodiments, the comparing involves the TPOW 50 displaying one or more corresponding parameters of the initial test plan and the alternative test plan to a user for review. The displaying may be performed using the dashboard 230 described with respect to FIG. 2. The comparison may be based on any suitable parameter, including but not limited to: effort distribution (e.g., test processes and effort allocation); total test effort; defect distribution (e.g., discovered defects by triggers in each activity and residual defects); testing cost; defect fixing cost; business cost; and schedule (e.g., total project duration, and individual test activity duration by teams).

Generating a Test Plan

Figure 6:
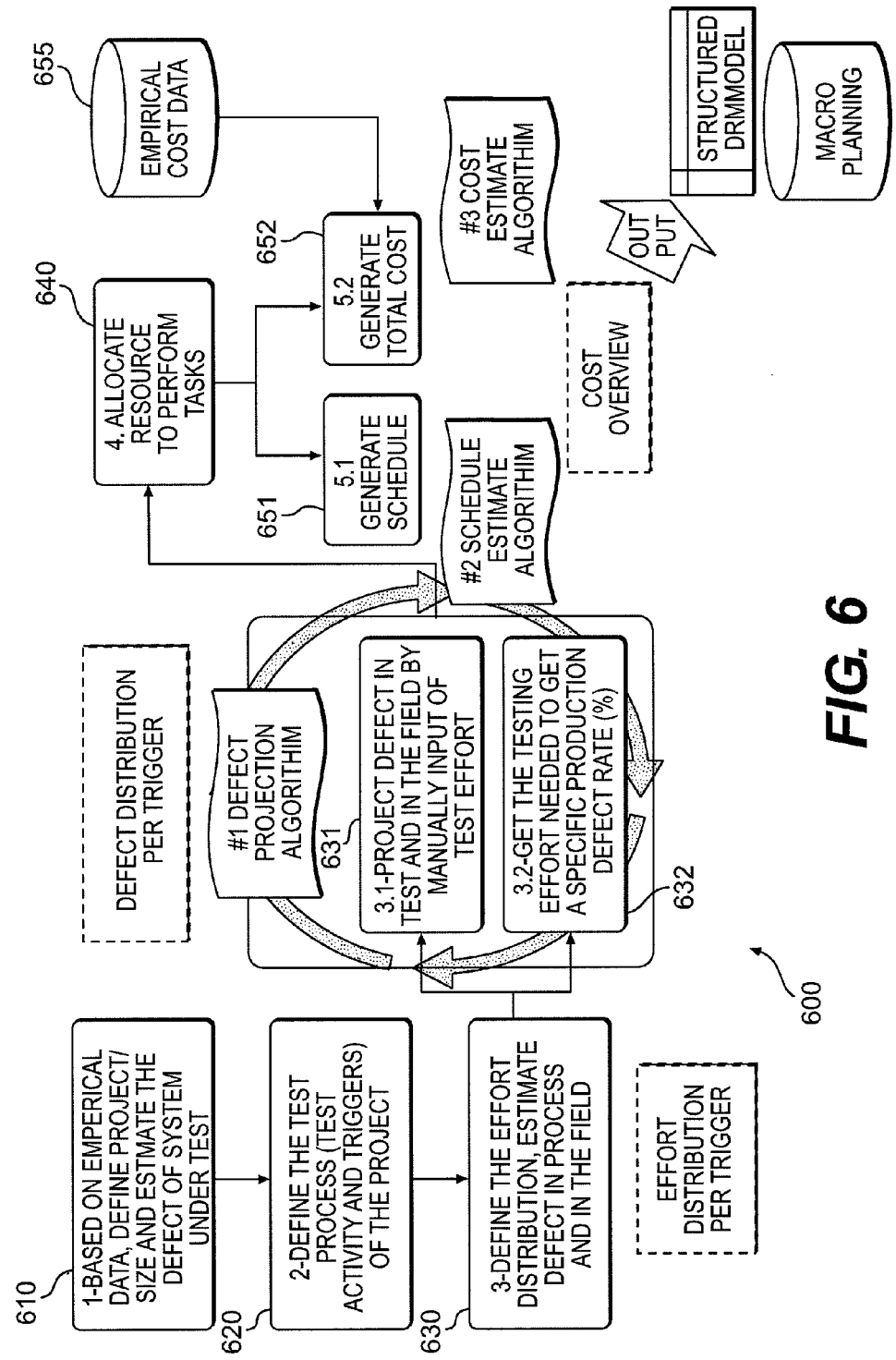
FIG. 6 illustrates a high level flow associated with macro planning in accordance with aspects of the invention.

FIG. 6 illustrates a high level flow 600 associated with generating a test plan (e.g., a macro plan) in accordance with aspects of the invention. The steps of FIG. 6 may be implemented in the environments of FIGS. 1 and/or 2. For example, the processes described in FIG. 6 may be performed using the TPOW 50, and in particular the defect projection engine 30, schedule generation engine 32, cost calculation engine 34, as described with respect to FIG. 1.

In accordance with aspects of the invention, during the macro planning stage, a user provides data to the TPOW 50, and the TPOW 50 generates an estimated effort distribution and defect distribution for the entire testing project. In embodiments, the effort distribution and defect distribution are arranged in terms of ODC/DRM activities and triggers. In embodiments, the TPOW 50 generates the effort distribution and defect distribution using pre-defined logic, rules, and probability tables, which may be based on based on analysis and/or data-mining of historic data from past test projects and ODC/DRM defect analysis, and which may be programmed into the TPOW 50 (e.g., stored in the storage system 22B of FIG. 1). In accordance with further aspects of the invention, the TPOW 50 additionally generates a high-level schedule for the testing project and a cost overview based on the effort distribution, defect distribution, and additional data provided by the user.

In accordance with aspects of the invention, generating a test plan includes inputting empirical data to the TPOW 50. The data may include, but is not limited to organizational maturity level, code size, etc. Additionally, the test processes (e.g., activities to be performed during the test) are defined. The test process may be automatically suggested by the TPOW 50 and/or may be manually defined and/or adjusted by a user. The TPOW 50 automatically generates an effort distribution and a defect distribution for the project based on the input data and the activities. The user may perform an iterative process including at last one of: estimating a defect distribution in the test activities and in production (the column labeled "Field in the exemplary user interface in FIGS. 4A and 4B) by manually specifying a total test effort, and estimating an effort distribution in each activity required to achieve a manually specified production defect rate. Additionally, resources (e.g., test teams of people) may be defined and assigned to the activities of the test plan. In further embodiments, a test schedule is generated based on the effort distribution, defect distribution, and resource assignments. In even further embodiments, one or more test costs are generated based on the effort distribution, defect distribution, resource assignments, and empirical cost data.

More specifically, at step 610, empirical data is provided to the TPOW 50. In embodiments, the empirical data may be input by a person (e.g., an end user, a consultant or service provider assisting a customer, etc.) using an interface implemented in a computing device, such as for example, an I/O device 28 as described above with respect to FIG. 1. In embodiments, the empirical data may be any suitable data that can be used in estimating effort distribution and/or defect distribution across the lifecycle of a project. For example, in embodiments, the empirical data includes, but is not limited to, maturity level of the organization performing the test, size of code to be tested, etc. Based on the maturity level and size, the TPOW 50 estimates the total number of defects that are expected to be uncovered with respect to the System Under Test (SUT), as described in commonly assigned co-pending application Ser. No. 12/558,327, the contents of which are hereby expressly incorporated by reference in their entirety.

At step 620, the test processes are defined. In embodiments, this includes defining the activities that will be used in the macro plan. In embodiments, the TPOW 50 automatically generates a suggested test process template, including suggested test activities, based on the maturity level and size from step 610. This may be performed, for example, by the TPOW 50 utilizing predefined logic and probability tables (e.g., stored in storage system 22B of FIG. 1) that define what activities are best suited for project having the given input data (e.g., maturity level, size, etc.). In embodiments, the user is presented with the suggested test process template and has the ability to modify the activities that will be used in the macro planning.

Still referring to FIG. 6, at step 630, the TPOW 50 automatically generates an effort distribution and a defect distribution for the project. In embodiments, step 630 may also include permitting the user to input a constraint that further affects the generation of the effort distribution and a defect distribution. In further embodiments, step 630 may additionally include permitting the user to adjust calculated values of the generated effort distribution and/or defect distribution, which causes the TPOW 50 to recalculate the effort distribution and/or defect distribution based on the adjusted values.

In accordance with aspects of the invention, the effort distribution comprises a calculated value associated with each activity (e.g., the activities defined in step 620), which value represents an estimated amount of effort (e.g., person days) that will be required to complete the activity during the test. In embodiments, the estimated effort for each activity is further broken down into effort associated with each trigger in that activity.

In accordance with further aspects of the invention, the defect distribution comprises a calculated value associated with each activity (e.g., the activities defined in step 620), which value represents an estimated number of defects that will be uncovered and handled during that activity of the test. In embodiments, the estimated number of defects for each activity is further broken down into estimated number of defects associated with each trigger in that activity.

In accordance with aspects of the invention, the effort distribution and defect distribution are generated by the TPOW 50 using logic, rules, and probability tables, and are based on the data from steps 610 and 620 and the user-defined constraint provided in step 630. For example, the logic, rules, and probability tables may be based on analysis and/or data-mining of historic data from past test projects and ODC/DRM defect analysis. More specifically, for a project having a particular organizational maturity level, code size, and group of activities, trends about where defects are most likely to happen (e.g., which activities and triggers) and how much effort is required for each activity and trigger may be gleaned from historic data and programmed into logic, rules, and probability tables of the TPOW 50. Then, given the set of data for the current project (e.g., organizational maturity level, code size, and group of activities), the TPOW 50 may use the logic, rules, and probability tables to estimate an effort distribution and defect distribution.

In embodiments, the constraint provided in step 630 may comprise a user input value of total effort (e.g., in person days) for the entire test (e.g., all activities). Alternatively, the constraint provided in step 630 may comprise a user-input value related to a quality goal (e.g., a maximum production defect percentage). The user-defined constraint further influences how the TPOW 50 calculates the effort distribution and defect distribution in step 630.

For example, a constraint regarding a maximum total project effort (e.g., 1500 person days) means that the effort distribution is calculated such that the sum of effort for all activities does not exceed the total effort. This may in turn affect the defect distribution, for example, resulting in an estimation of fewer total defects handled during testing (e.g., the activities) and more residual defects pushed into production (e.g., the field). In embodiments, when a user elects to define the constraint in terms of total effort (e.g., total cost), the method proceeds from step 630 to step 631, which comprises estimating a defect distribution in the test activities and the field by manually specifying a total test effort.

Conversely, a user-defined constraint regarding a maximum production defect percentage affects the defect distribution by limiting how many defects are permitted to be estimated as production (e.g., field) defects. This may, for example, increase the number of defects associated with one or more activities, which may in turn affect (e.g., increase) the effort distribution. In embodiments, when a user elects to define the constraint in terms of a specific production defect rate (e.g., maximum permissible field defect rate), the method proceeds from step 630 to step 632, which comprises estimating an effort distribution in each activity required to achieve a manually specified production defect rate.

Still referring to FIG. 6, at step 640, resources are allocated to perform tasks associated with the activities of the test plan. In embodiments, a resource represents something that performs a task. For example, a resource may be a person, a team of people, a computing resource, etc.

In embodiments, a global resource model (e.g., database) is pre-populated with data identifying numerous resources. In step 640, resources are selected from the global resource model and assigned to respective activities (e.g., System Test, Code Inspection, etc.) for handling the estimated effort associated with the respective activities. The resources may be selected manually be the user via a user interface, for example, by browsing and/or searching the global resource model.

Additionally or alternatively, the TPOW 50 may automatically suggest resources based on a predefined test competency model that matches predefined attributes of the resources in the global resource model with attributes of the activities to be performed. In embodiments, attributes associated with resources and defined in the global resource model may include, for example, skills, language, billing rate, efficiency, geographic location, etc. Methods and systems for modeling and simulating resources, such as those described with respect to step 640, are described in commonly assigned co-pending application Ser. No. 12/558,263, the contents of which are hereby expressly incorporated by reference in their entirety.

In further embodiments, the test competency model describes and captures the association of the assigned testing resources with the activities. For example, the test competency model may describe an "availUnitPercentage" for an assigned resource, which represents what percentage of work in a particular activity (e.g., System Test) is allocated to the assigned testing resource. For example, a single resource may be assigned to perform 100% of the work in one test activity. Alternatively, implementations of the invention also support a scenario where several testing resources together perform the one test activity, e.g., where the sum of all testing resources assigned to an activity equals 100%. In additional embodiments, the test competency model may describe an efficiency rating for an assigned resource, which represents how efficiently the resource (e.g., test team) can perform the test activity. The efficiency may be based on empirical (e.g., historical) data associated with the particular resource, where any suitable value may be assigned based on an assessment of the test team.

Still referring to FIG. 6, at step 651, a test schedule is generated based on the effort distribution, defect distribution, and resource assignments. In embodiments, the TPOW 50 is programmed with scheduling logic (e.g., schedule generation engine 32) that takes into account the effort distribution (e.g., how many person days are allocated to each activity) and resource assignments (which people are assigned to which activity), and creates a testing schedule for the resources. The schedule may be defined in terms of triggers, and may also take into account any constraints such as Unit Test activities are to be completed before System Test activities begin.

At step 652 a total test cost is generated based on the effort distribution, defect distribution, resource assignments, and empirical cost data 655. In embodiments, the TPOW 50 is programmed with cost estimation logic (e.g., cost calculation engine 34) that takes into account the effort distribution (e.g., how many person days are allocated to each activity) and resource assignments (which people or other resources are assigned to which activity), empirical cost data (e.g., the billing rate for assigned resources, etc.), and generates total test cost for the test plan. The cost estimation logic may also take into account empirical cost data that defines the cost to fix a defect at any time (e.g., activity) in the process. For example, the cost to fix a defect typically increases significantly with time after the Unit Test, and such defect-cost-versus-time data may be predefined in the empirical cost data 655. In this manner, the TPOW 50 may further refine the total test cost based on a defect fix cost based on the defect distribution. Additionally, the cost estimation logic may apply any business cost rules that are defined in the empirical cost data 655. In this manner, the TPOW 50 may generate a total cost that is made up of a test cost, defect fix cost, and business cost. Of course, the invention is not limited to these types of costs, and any desired costs may be used within the scope of the invention.

The steps of FIG. 6 are further described herein with respect to FIGS. 7-17, which show exemplary user interfaces and underlying functionality of an exemplary implementation of a TPOW 50 in accordance with aspects of the invention. It is to be understood that the invention is not limited by the graphical user interfaces shown in FIGS. 7-17, and that the invention may be implemented in other manners not depicted in FIGS. 7-17.

Figure 7:
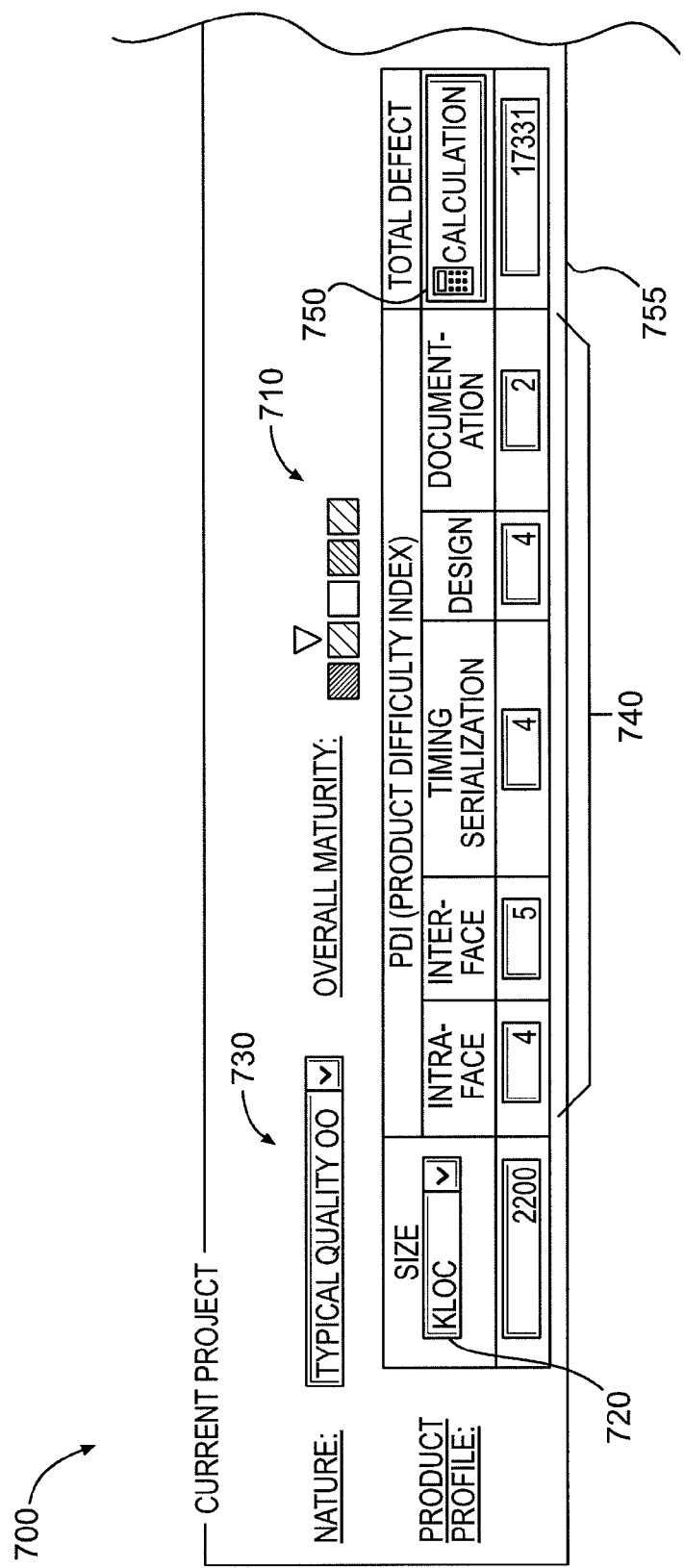

For example, FIG. 7 shows an exemplary user interface 700 of an implementation of a TPOW 50 in which a user enters empirical data associated with step 610. Using the interface 700, a person may select a maturity level 710 for the organization. The interface 700 also permits a user to select a definition if unit of measure to be used for project size, e.g., KLOC (thousand lines of code) or some other predefined metric, from a drop-down menu 720, and input a quantitative value for the project size in an input field 725. In embodiments, the interface 700 also permits a user to select a nature of the project from a drop down menu 730, which contains predefined selections relating to the type and/or technology of the code being tested. In further embodiments, the interface 700 may provide the user with input fields 740 for inputting qualitative values relating to various parameters associated with a POI (Product Difficulty Index). The PDI parameters may include, but are not limited to: Intraface, Interface, Timing Serialization, Design, and Documentation. Additionally, the interface 750 may include a field (e.g., click button) 750 that a user can select to cause the TPOW 50 to estimate the total number of expected defects 755 for the project based on whatever data has been input into the various fields of the interface 700.

Figure 8:
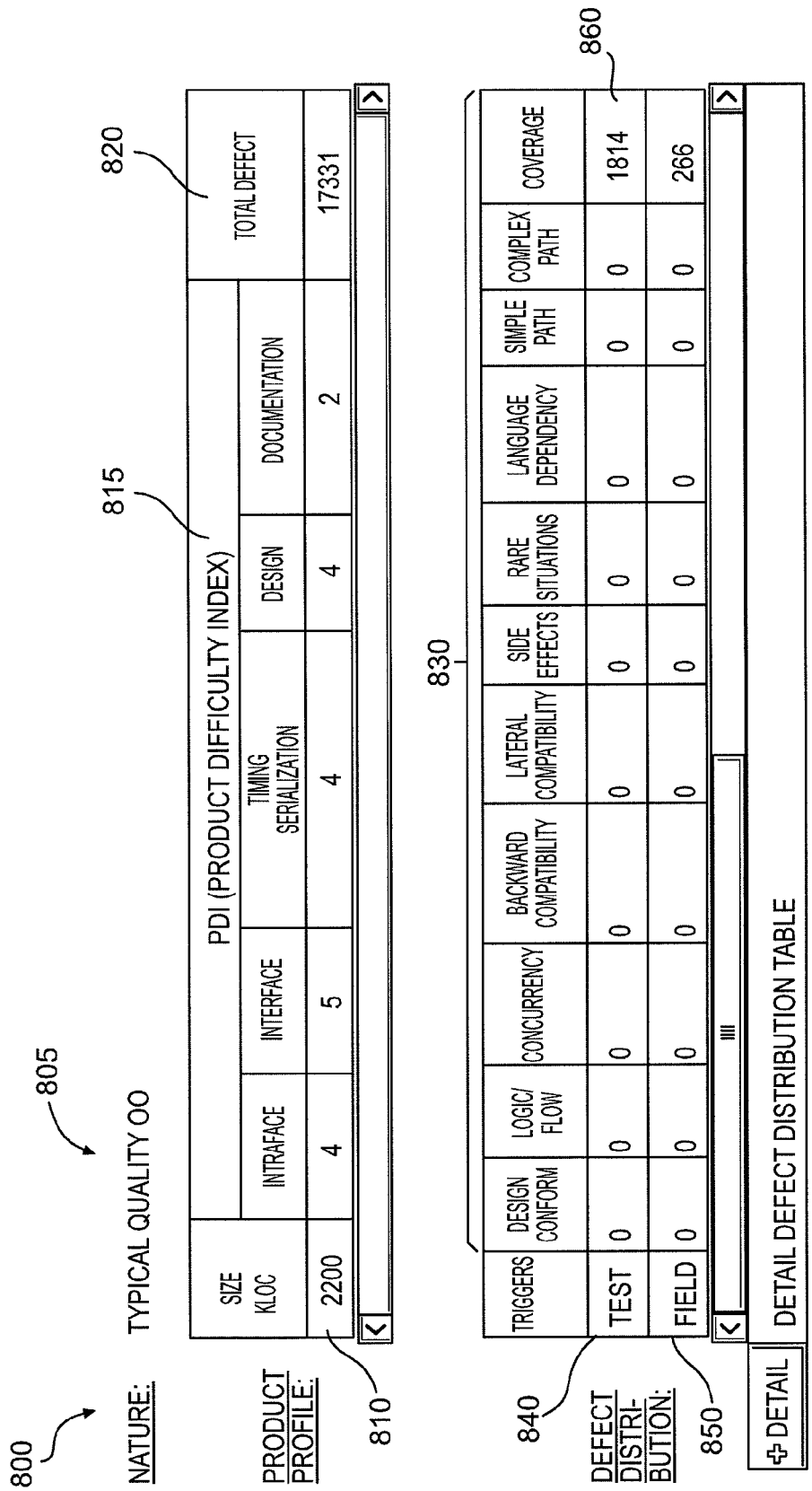

FIG. 8 shows another exemplary user interface 800 of an implementation of a TPOW 50 that is automatically generated by the TPOW 50 based on the data described above with respect to FIG. 7. In embodiments, the interface 800 displays the input data, such as nature 805, size 810, PDI values 815, and estimated total number of defects 820. In embodiments, the interface 800 also displays an estimated defect distribution chart that shows the number of defects broken out according to triggers 830 and whether the defects will be found during test 840 or in the field (i.e. production) 850. For example, cell 860 indicates that 1814 defects classified in the coverage trigger are expected to be found during testing of the SUT. The defect distribution generated by the TPOW 50 at step 610 is a preliminary estimate of total defects per trigger but not in terms of activities, and will be refined in subsequent steps as described herein.

Figure 9:
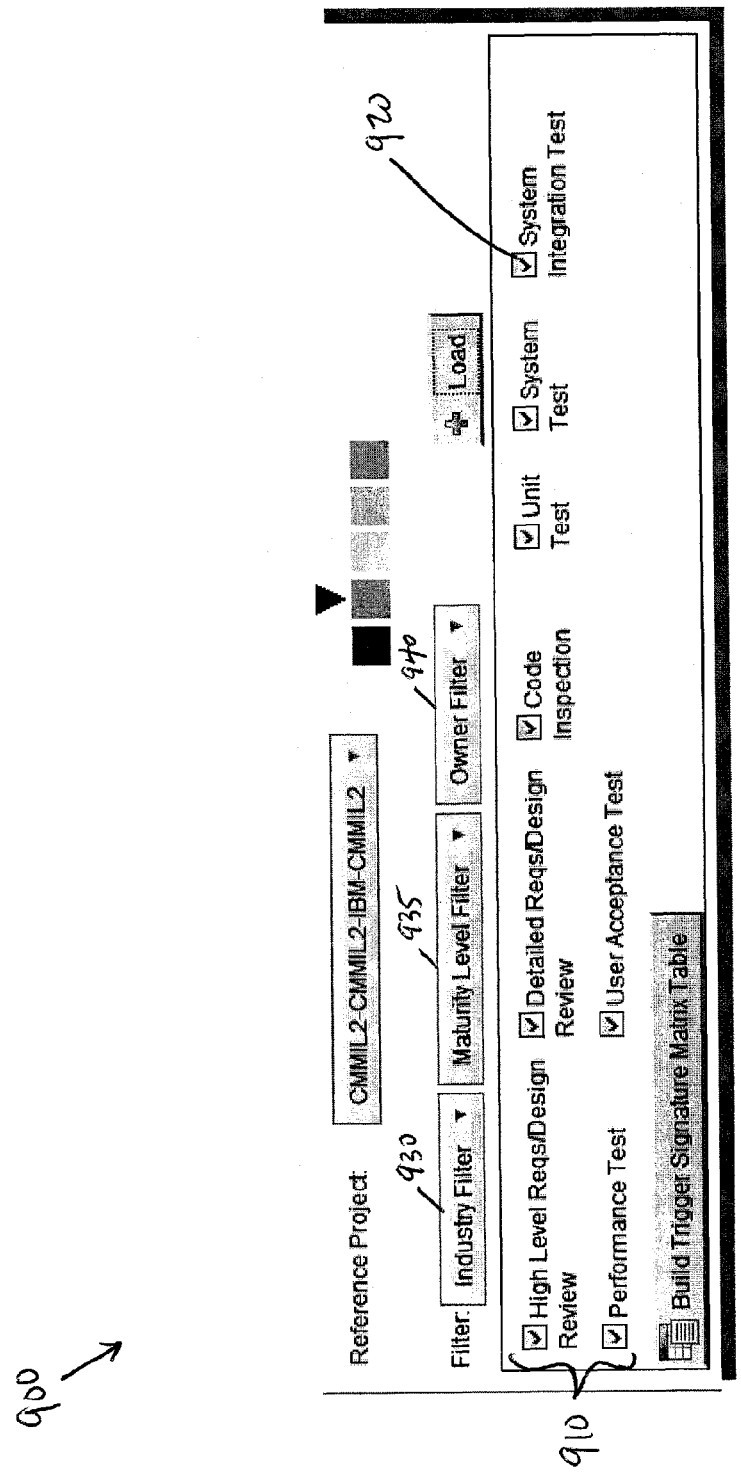

FIG. 9 shows an exemplary user interface 900 of an implementation of a TPOW 50 in which automatically suggested test activities 910 (e.g., ODC/DRM activities), as described with respect to step 620, are displayed to the user. In embodiments, the user may unselect any of the suggested activities using a check box field 920 associated with each individual activity. Optionally, the user may cause the TPOW 50 refine the automatically suggested test activities 910 by selecting one or more filters from one or more drop down menus 930, 935, 940 containing predefined lists of filters. In embodiments, the filters are related to, for example, the type of industry of the SUT, the maturity level, and the test owner, and provide further data with which the TPOW 50 uses predefined logic and probability tables to automatically generate suggested test activities 910.

For example, FIG. 10 shows an exemplary user interface 1000 of an implementation of a TPOW 50 in which a user has input a constraint associated with total effort, e.g., 1890.63 person days (PD), in cell 1010. Based on this constraint, the data from steps 610 and 620 (e.g., maturity level, size, defined activities, etc.), and the programmed logic, rules, and probability tables, the TPOW 50 generates an effort distribution. In embodiments, the effort distribution includes an EFP (Effort Percentage) 1015 and EFF (Effort Amount) 1020 for each activity 1025. For example, the value "6" in cell 1030 means that six percent of the total effort for the project is estimated (e.g., suggested by the TPOW 50) to be spent in the activity of Code Inspection. In embodiments, the TPOW 50 is programmed such that the sum of the EFP for all activities equals 100%. Still referring to the interface 1000, cell 1035 indicates that "113.44" PD (e.g., 1890.63 total PD from cell 1010 times 6% from cell 1030) are estimated to be spent performing the Code Inspection activity.

Still referring to the interface 1000, the effort distribution is further broken down into the triggers associated with each activity. For example, cell 1040 indicates that 20% of the effort of the Code Inspection activity is estimated (e.g., suggested by the TPOW 50) for handling issues associated with the Design Conform trigger. Additionally, cell 1045 indicates that 80% of the effort of the Code Inspection activity is estimated for handling issues associated with the Logic Flow trigger. In embodiments, the TPOW 50 is programmed such that the sum of the EFP for all triggers in a single activity (e.g., Code Inspection) equals 100%. As further depicted in FIG. 10, cell 1050 indicates that "22.69" PD of effort (e.g., 20% from cell 1040 times 113.44 PD from cell 1035) is estimated as being associated with the Design Conform trigger during the Code Inspection activity, and cell 1055 indicates that "90.75" PD of effort (e.g., 80% from cell 1045 times 113.44 PD from cell 1035) is estimated as being associated with the Logic Flow trigger during the Code Inspection activity.

In embodiments, the user may adjust the value of the total effort in cell 1010, and the TPOW 50 will recalculate the effort distribution based on the new value of total effort. Additionally or alternatively, the user may adjust one or more of the EFP cells (either at the activity level or trigger level within an activity), and the TPOW 50 will recalculate the effort distribution based on the new value(s). In embodiments, the test effect estimation module 36 recalculates the effort and defect distributions based on the new value(s), such that the effects of any such changes are propagated through the effort and defect distributions. In embodiments, the EFP values may only be changed within a predefined range determined by the changeable parameters configuration engine 38 based on the programmed logic, rules, and probability tables. For example, cell 1065 has an estimated value of "96". The changeable parameters configuration engine 38 limits a user to changing the value of cell 1065 to within the range of "92-100" and this range is also displayed in the cell 1065. If the user does change the value of cell to something other than "96", then the test effect estimation module 36 will recalculate the effort and distributions based on the new value of cell 1065.

Figure 11:
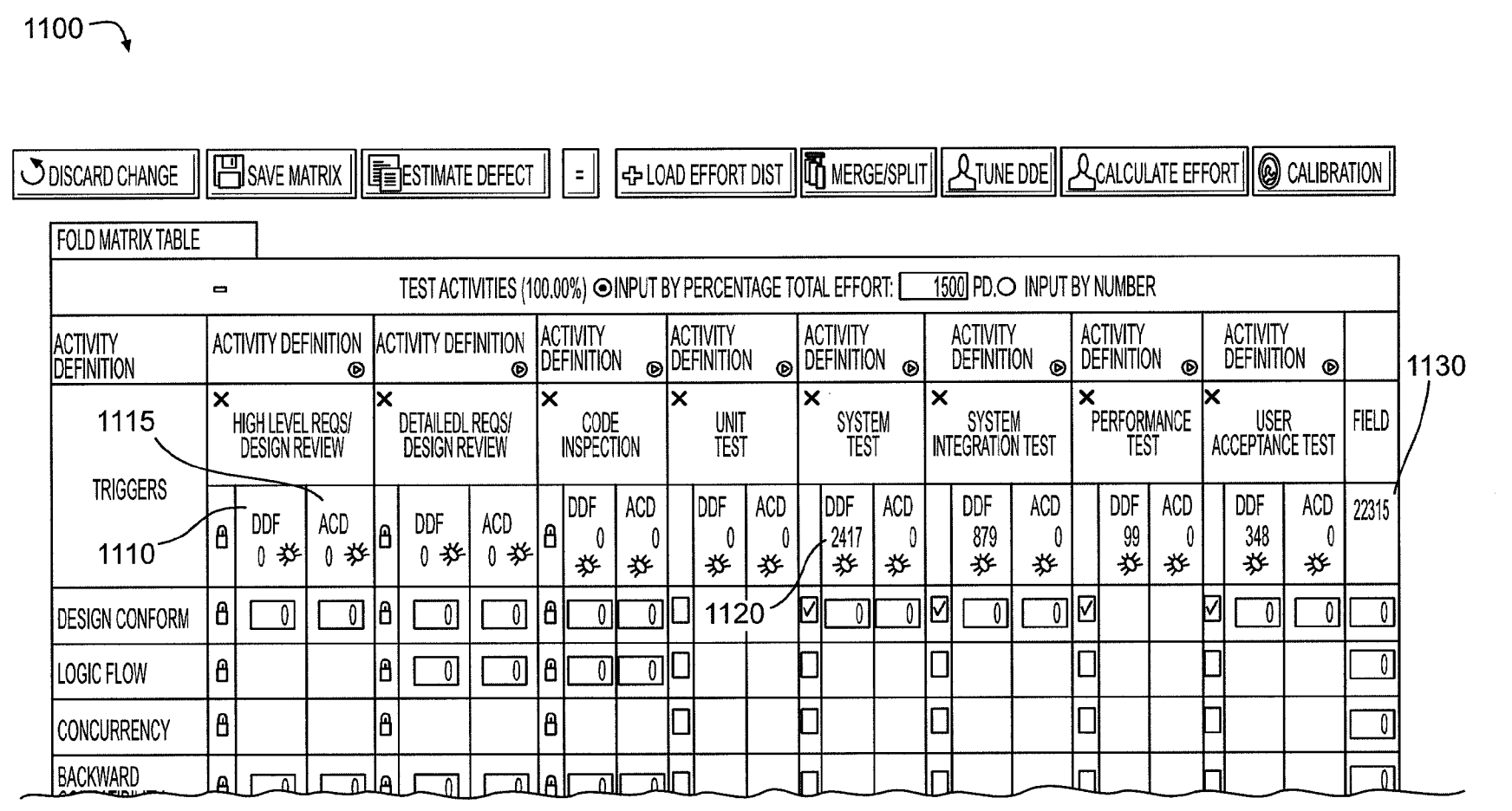

FIG. 11 shows an exemplary user interface 1100 of an implementation of a TPOW 50 depicting an exemplary defect distribution generated in accordance with aspects of the invention. In the interface 1100, each activity has an estimated value of DDF (Discovered Defect Forecast) 1110 and a value of ACD (Actual Defects Found) 1115. For example, the activity System Test has a DDF value of 2417 (e.g., cell 1120), which indicates that 2147 defects are forecast by the TPOW 50 to be uncovered during the System Test activity. Cell 1130 indicates that 22315 defects are estimated to be discovered in production (e.g., in the field, after testing has completed).

Figure 12B:
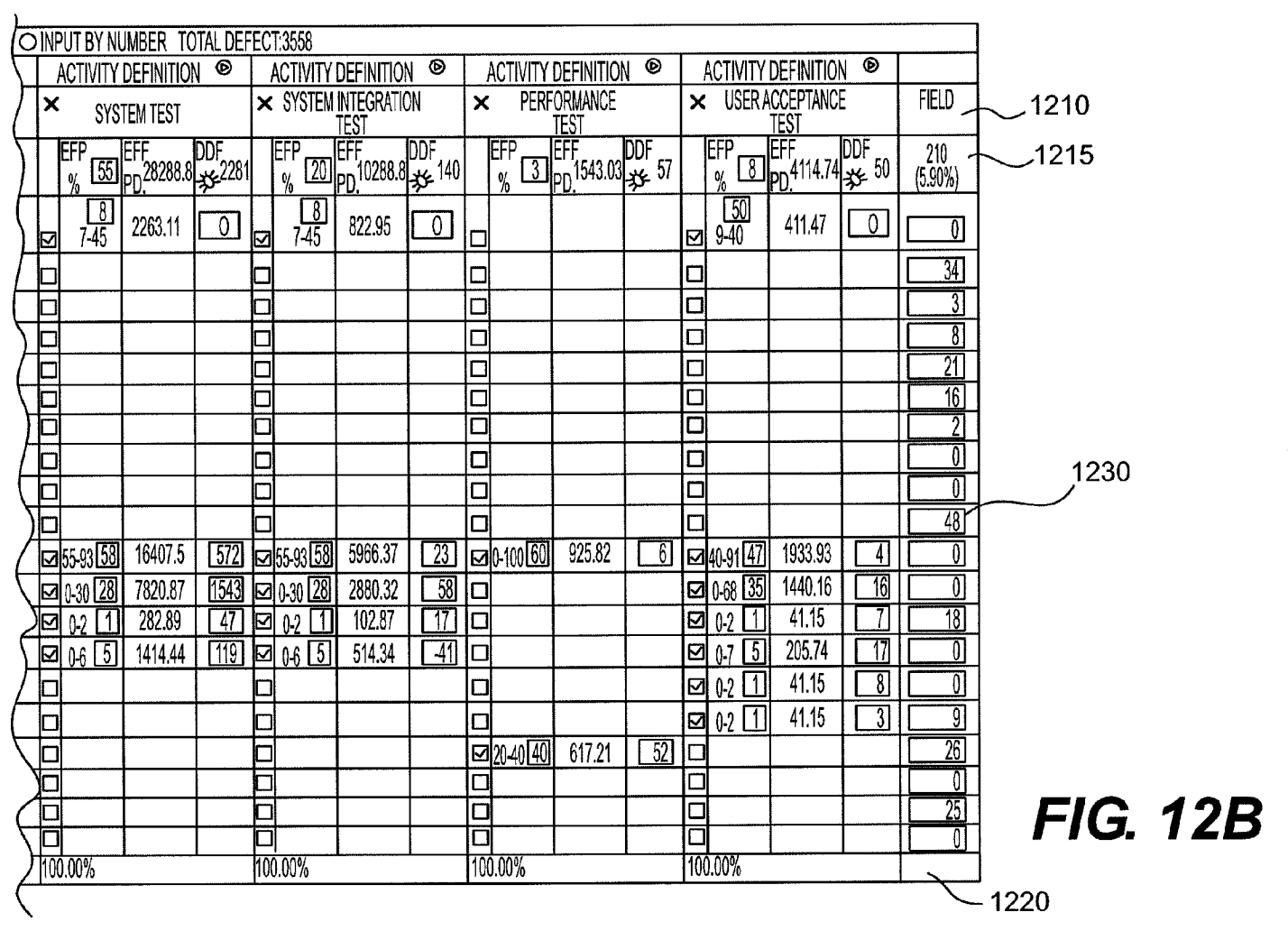

FIGS. 12A and 12B show an exemplary user interface 1200 of an implementation of a TPOW 50 depicting a combined effort distribution and defect distribution generated in accordance with aspects of the invention. In embodiments, in step 630, the effort distribution is generated first (e.g., as already described), and then the defect distribution is generated based on the effort distribution. The EFP, EFF, and DDF shown in interface 1200 are similar to that described with respect to FIGS. 10 and 11.

In embodiments, the interface 1200 also includes a "Field" column 1210 which indicates a number of defects that are estimated to be found in the field (e.g., in production after testing is complete). A total number of estimated field defects is provided in cell 1215, and an estimated number of field defects per trigger is provided in cells 1220. The estimated field defects are generated by the TPOW 50 as part of the effort distribution and defect distribution (e.g., based upon the input data, any user defined constraints, and the programmed logic, rules, and probability tables). In this manner, the TPOW 50 provides a powerful planning tool that allows a user to predict what types of resources will be needed on hand after a product is released. For example, in the example depicted in FIGS. 12A and 12B, cell indicates 1230 indicates that the most field defects will be associated with the Complex Path trigger. Accordingly, a manager may utilize this information to staff a production troubleshooting team with people capable of handling issues associated with the Complex Path trigger.

Figure 13:
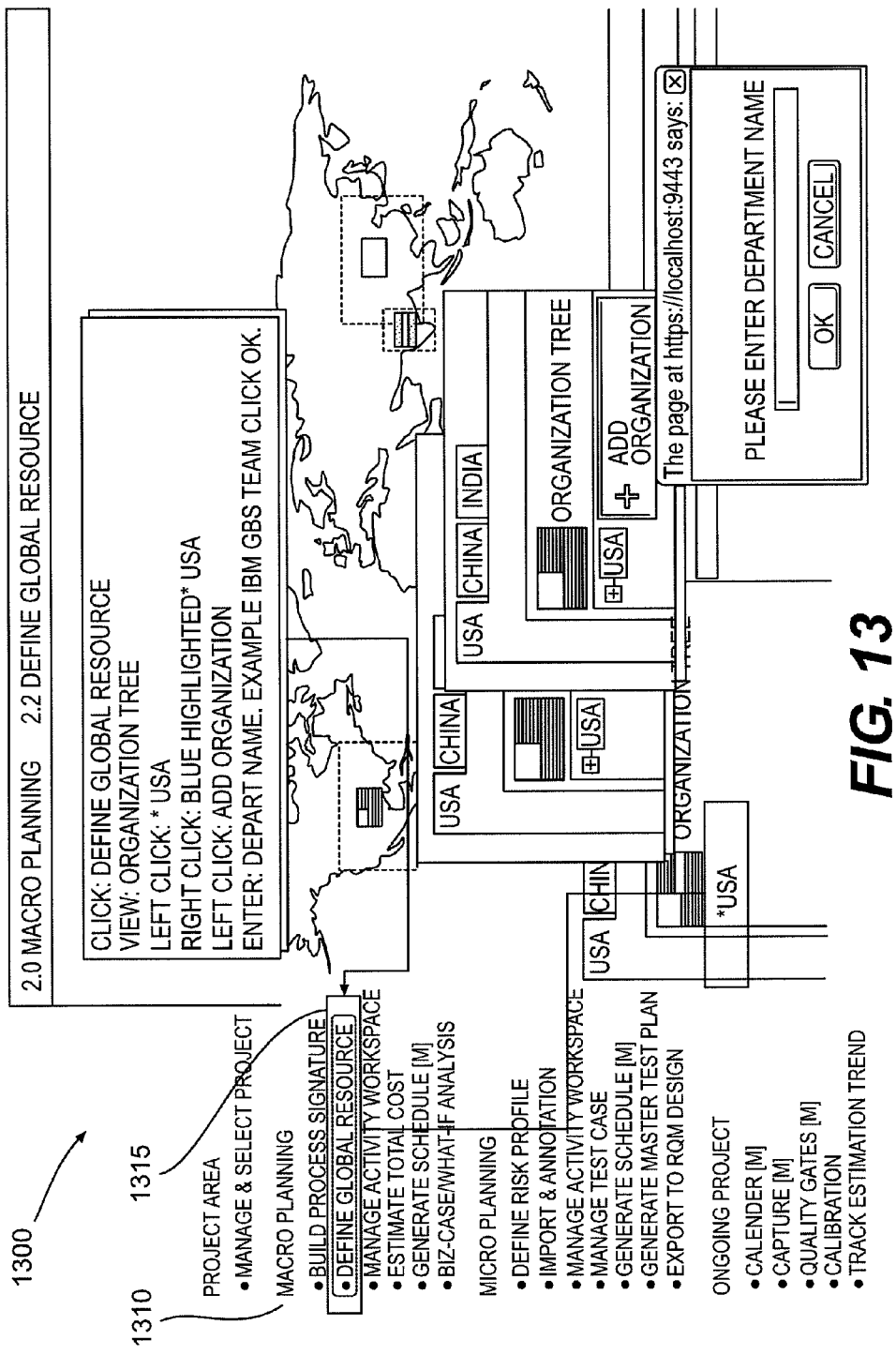

In accordance with aspects of the invention, test schedule is calculated (e.g., step 651) according to the devoted effort and the assigned team. In embodiments, the TPOW 50 permits a user to assign teams to test activities by defining global resources (e.g., teams) and assigning teams to test activities. For example, FIG. 13 shows an exemplary user interface (UI) 1300 of an implementation of a TPOW 50 depicting the functionality of defining a global resource, such as described above with respect to step 640 of FIG. 6. In embodiments, the UI 1300 includes an area 1310 in which macro planning tools are arranged, including a link 1315 for defining a global resource. By selecting (e.g., clicking on) the link 1315, the user may add an organization (e.g., create a definition of a test team) based on parameters such as geographic location (e.g., USA, China, India, etc.). Although not shown in FIG. 13, the UI 1300 also permits a user to assign individual resources (e.g., people) to the organization (e.g., team), and define attributes of the team and/or persons in the team (e.g., billing rate, efficiency, skill, languages, etc.).

Figure 14:
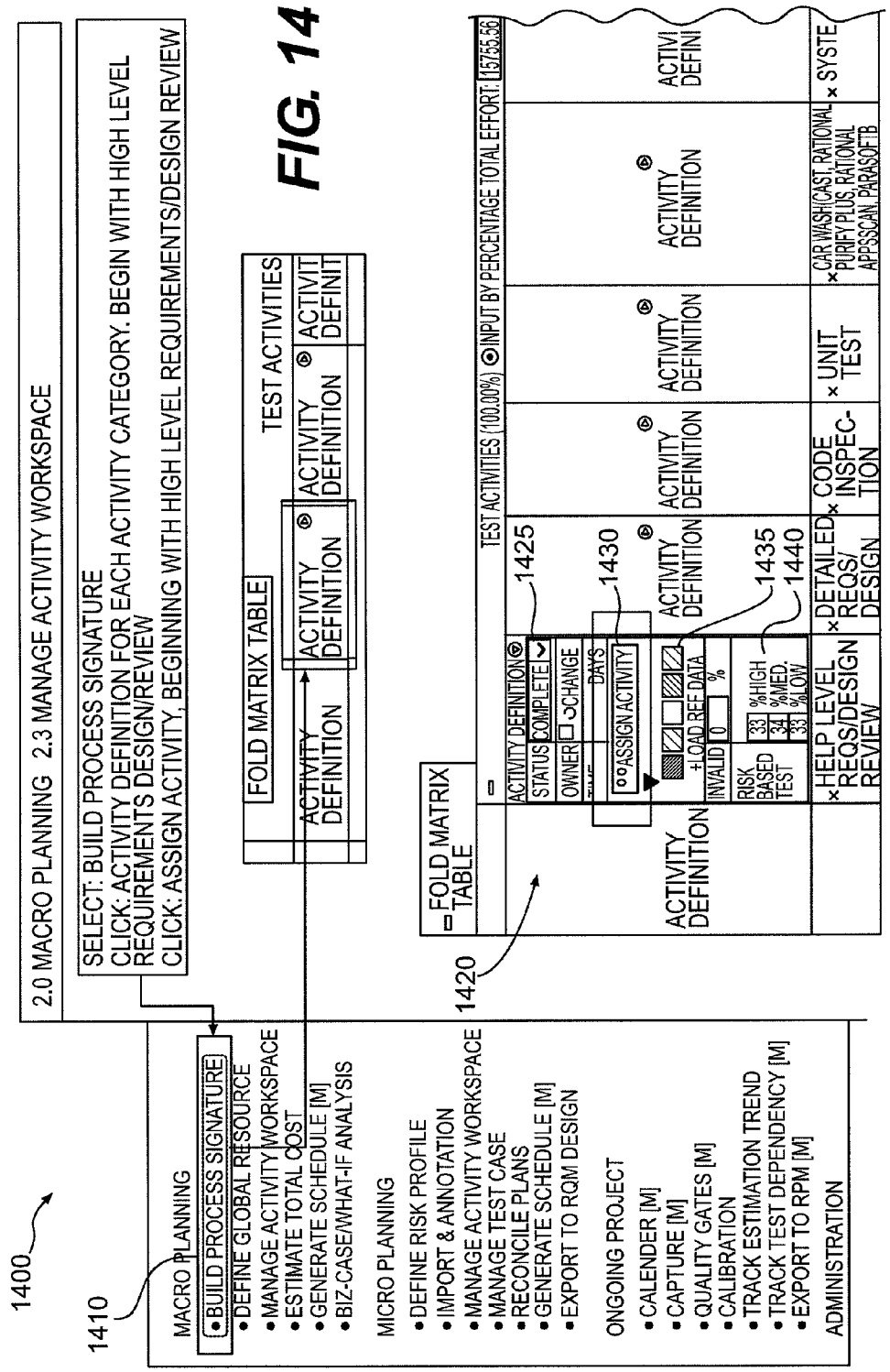

FIG. 14 shows an exemplary user interface (UI) 1400 of an implementation of a TPOW 50 depicting the functionality of associating a team (e.g., described above with respect to FIG. 13) with an activity (e.g., System Test, Performance Test, etc.), such as described above with respect to step 640 of FIG. 6. In embodiments, the UI 1400 includes a link 1410 for building a process signature. By selecting (e.g., clicking on) the link 1410, the user may define specific parameters associated with each activity. For example, the UI 1400 provides the user with an editable area 1420 in which the user may define parameters such as the status of the activity 1425, assign the activity to a team 1430, define a maturity level of the team performing the activity 1435, and define risk parameters associated with the activity 1440.

Figure 15:
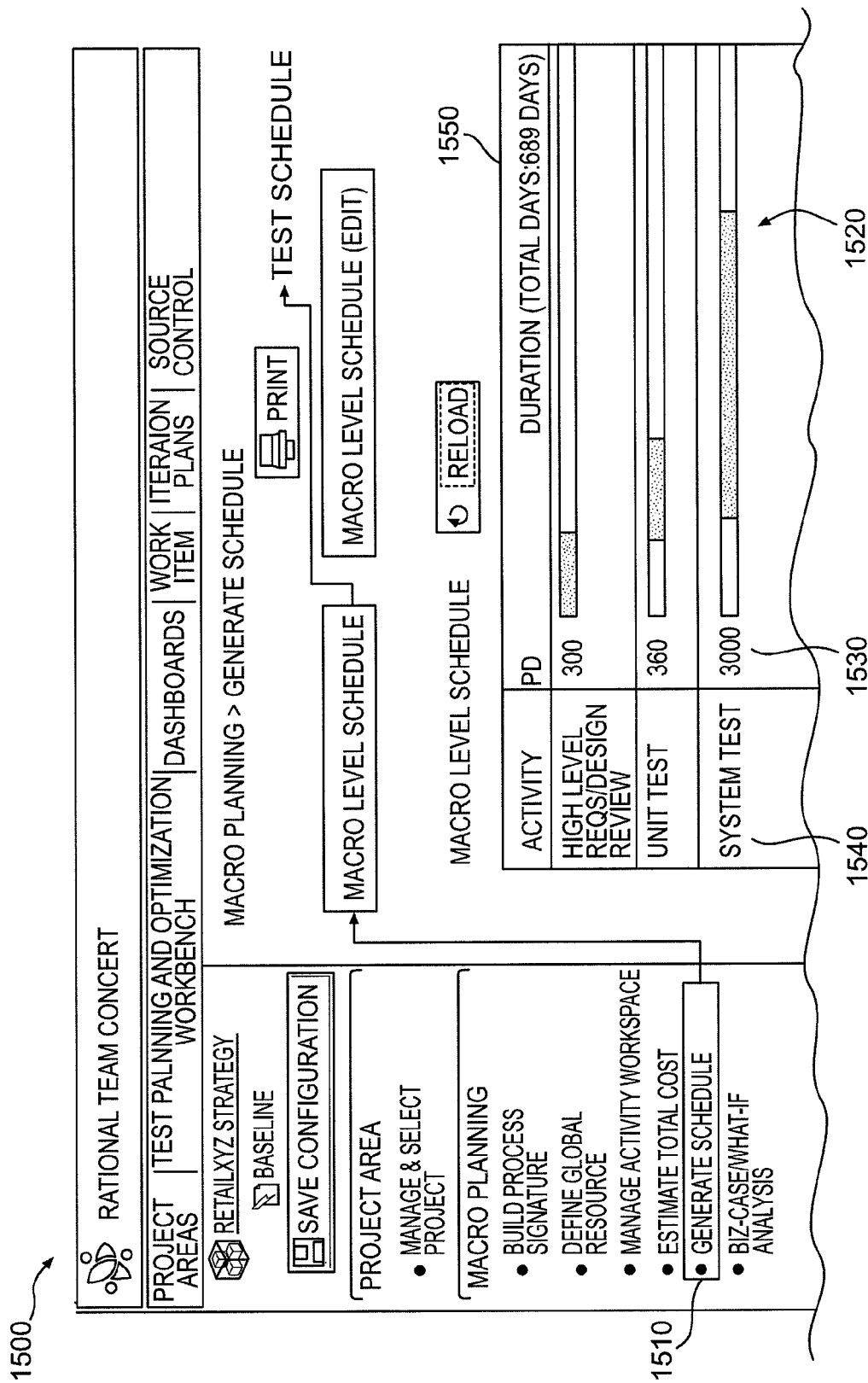

In embodiments, the data provided via UI 1300 and UI 1400 may be used by the schedule generation engine 32 and/or cost calculation engine 34 in determining a schedule and cost for the test project. For example, after teams are defined and assigned to activities, the schedule generation engine 32 generates a schedule based on: team duration, e.g., the performed task of a team (work percentage multiplied by the total effort of the activity)/staff number/work efficiency; activity duration, e.g., the maximum duration of team durations for this activity; and project duration, e.g., sum of activities' durations. For example, FIG. 15 shows an exemplary user interface (UI) 1500 of an implementation of a TPOW 50 depicting the functionality of generating a schedule. For example, the UI 1500 has a link 1510 that, when selected (e.g., clicked on) by a user, the TPOW 50 generates and displays a macro level schedule 1520 for the test project defined in terms of estimated activity duration 1530 for each activity 1540 and total duration 1550 of the project.

In accordance with aspects of the invention, the project cost may be defined in terms of different sub-costs, including but not limited to test cost (e.g., the cost to run tests to find defects), defect fix cost (e.g., the cost to fix found defects), and business costs (e.g., the cost associated with permitting a defect to escape testing and be present in the field). In embodiments, test cost includes the cost of the resources (e.g., people) performing the tests during the various activities, and depends upon the schedule. In embodiments, the cost generation engine 34 calculates the test cost, defect fix cost, and business cost.

Figure 16:
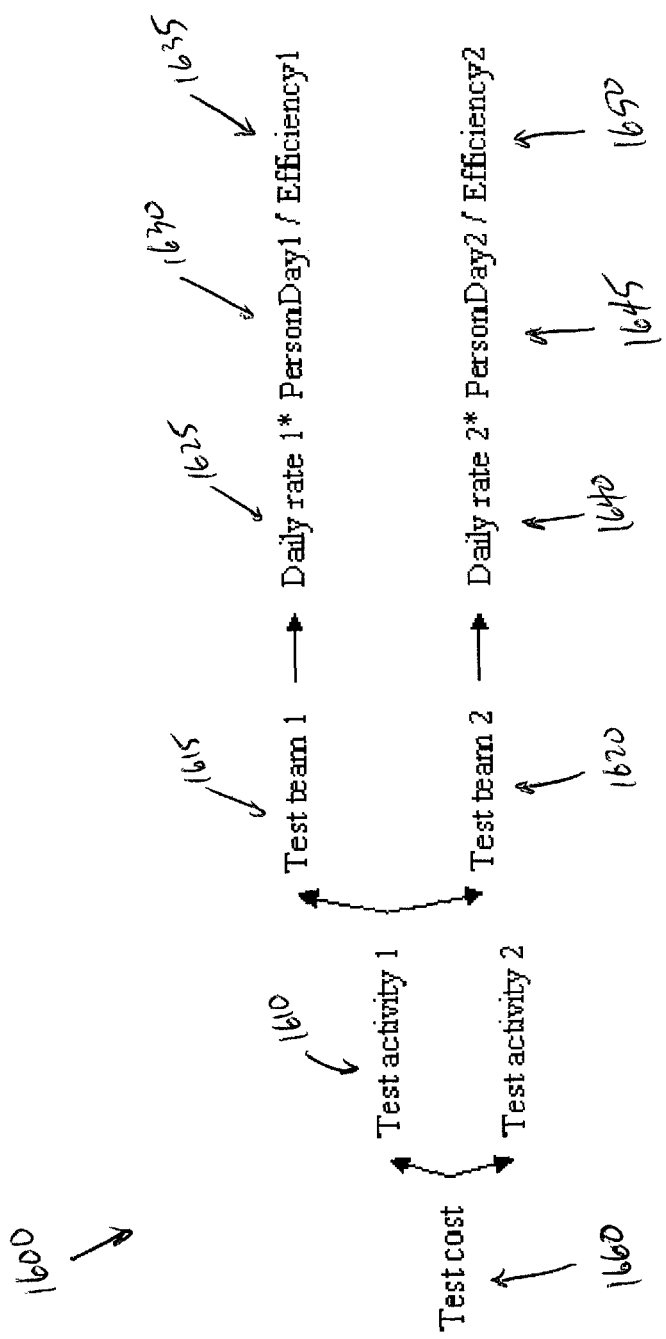

For example, FIG. 16 shows an exemplary diagram 1600 for calculating test cost per activity based on the team assigned to that activity. For example, in the diagram 1600, it can be seen that a first test activity 1610 is assigned to two teams, a first team 1615 and a second team 1620. The first team 1615 has a user-defined rate 1625 and efficiency 1635. The first team 1615 also has a duration 1630 previously estimated by the schedule generation engine 32. The second team 1620 also has a user-defined rate 1640 and efficiency 1650, and an estimated duration 1645 for working on this activity 1610. Based on this data, the cost generation engine 34 determines a test cost for the first activity 1610. In embodiments, the cost generation engine 34 similarly determines a test cost for each respective activity of the test, which can be summed to provide a total test cost 1660.

In embodiments, defect fix cost (e.g., defect diagnosis and resolution cost) is calculated by the cost generation engine 34 based on the number of defects discovered in each lifecycle activity (e.g., from the estimated defect distribution) multiplied by a user-defined parameter (e.g., defect diagnosis and resolution cost per defect by lifecycle activity, which is entered as input data into the TPOW 50). In additional embodiments, business cost is calculated by the cost generation engine 34 by multiplying the number of defects escaping to production (e.g., number of field defects in the estimated defect distribution) and business cost per defect (e.g., defined by the user and entered as input data into the TPOW 50).

Figure 17:
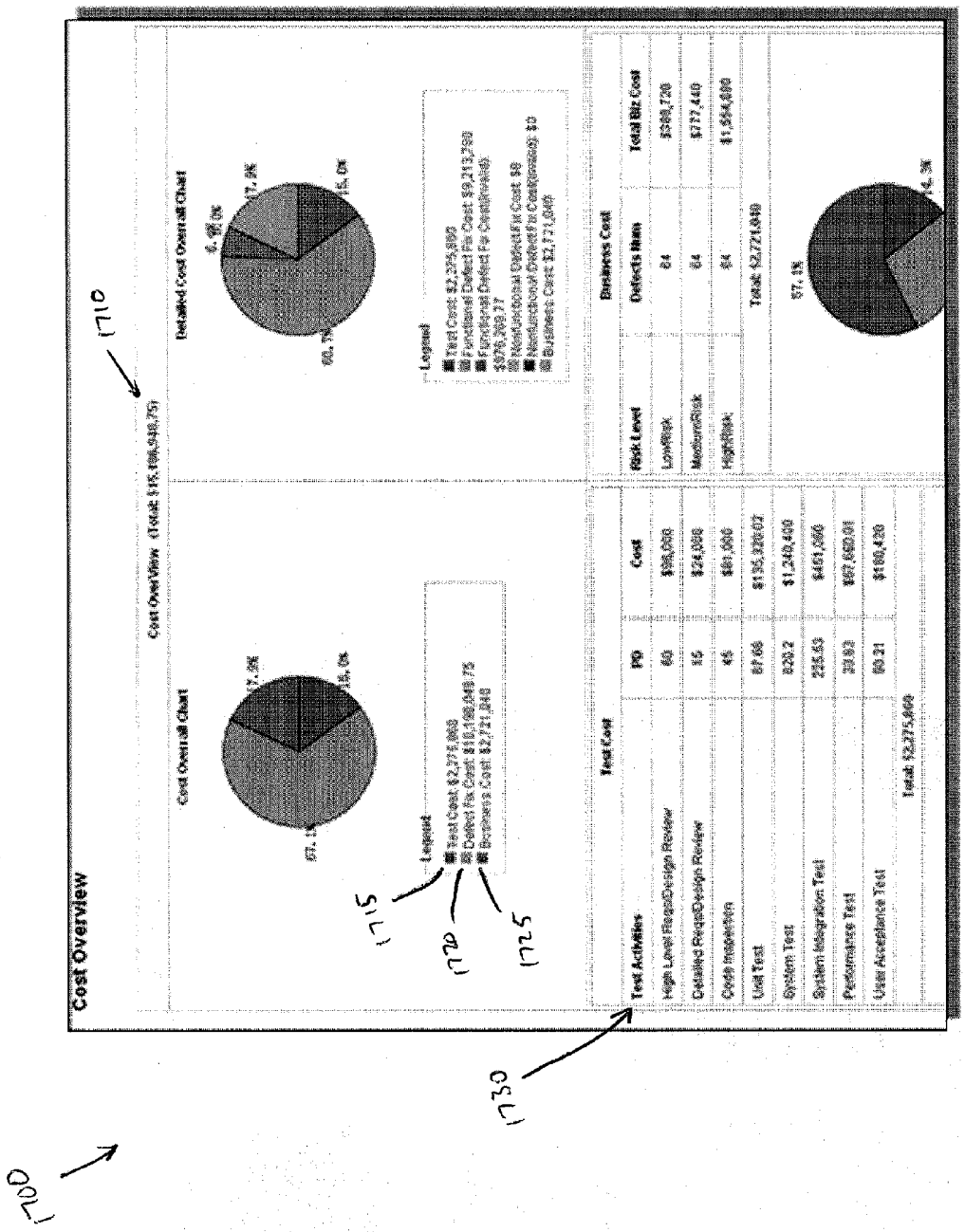

FIG. 17 shows an exemplary cost overview 1700 generated using an implementation of a TPOW 50 in accordance with aspects of the invention. In embodiments, the cost overview 1700 shows calculated data such as a total project cost 1710. The cost overview 1700 may also shows a breakdown of the total project cost into subcategories such as test cost 1715, defect fix cost 1720, and business cost 1725. The cost overview 1700 may also shows a subcategory (e.g., test cost) broken down by activities 1730. It is to be understood that the invention is not limited by the exemplary cost overview depicted in FIG. 17, and any suitable data presentation may be utilized within the scope of the invention.

Alternatives Analysis

In accordance with aspects of the invention, the steps described with respect to FIG. 6 and the functionality described with respect to FIGS. 7-17 may be used to create an initial test plan (e.g., initial macro plan). The initial test plan may correspond to the initial test plan described with respect to steps 550, 555, and 560 of FIG. 5. In embodiments, the initial test plan is saved (e.g., in data storage 22B of FIG. 1) as an initial configuration. In implementations, a user may then perform a 'what-if' analysis by generating an alternative test plan and comparing the initial test plan to the alternative test plan. The alternative test plan may be generated according to steps 565, 570, and 575 as described above with respect to FIG. 5. For example, a user may change the input data, which causes the TPOW 50 to automatically re-calculate the effort distribution, defect distribution, schedule, and cost.

In embodiments, when performing a what-if analysis, the user may change any number of parameters, including but not limited to any of the input data, such as: maturity level, code size, activities (e.g., tests processes to be performed), constraint (e.g., total effort or field defects). In further embodiments, the user may additionally or alternatively change one or more of the values of the effort distribution and/or the defect distribution that was already generated by the TPOW 50 in the initial plan (e.g., first configuration).

Figure 18:
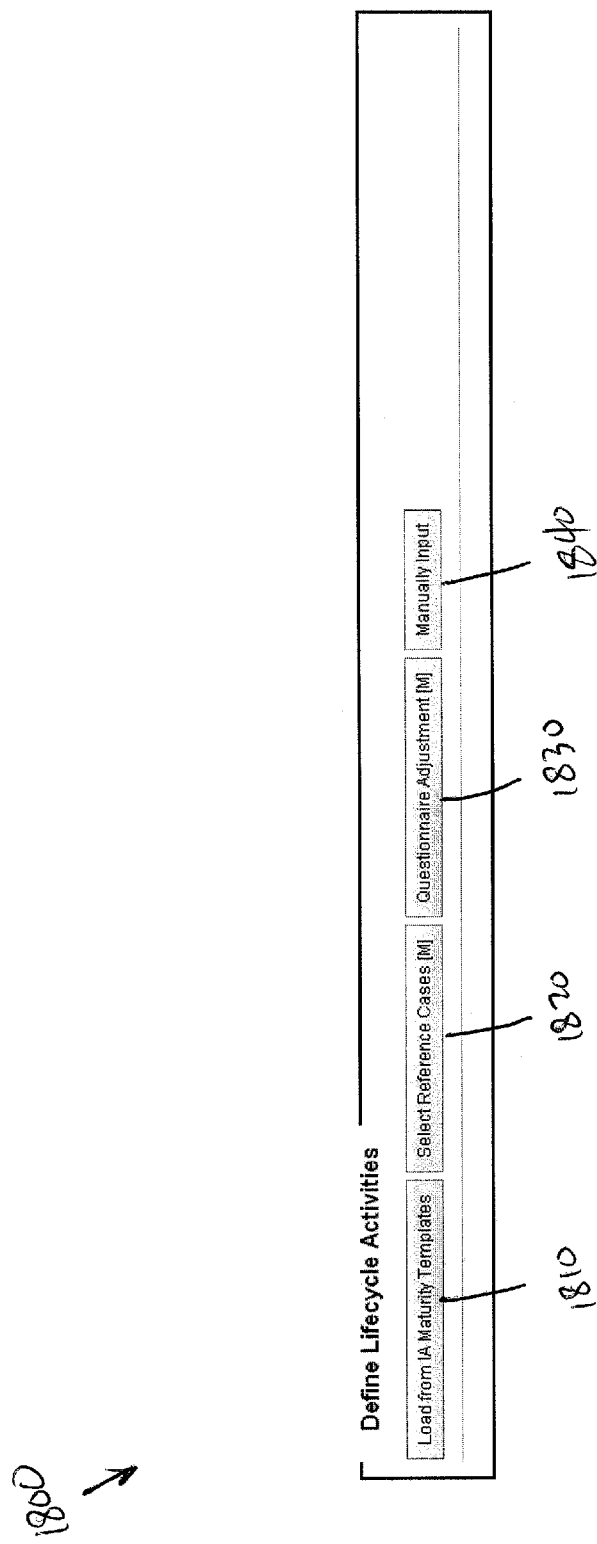

For example, FIG. 18 shows an exemplary user interface (UI) 1800 and underlying functionality provided in the TPOW 50 that permits the user to select an alternative set of activities (e.g., test process) for the alternative test plan. In a manner similar to that described with respect to FIG. 9, the UI 1800 permits a user to define the activities from pre-defined templates based on maturity level 1810 and pre-defined reference cases 1820. Additionally, the user may adjust the pre-defined activity profiles (e.g., from 1810 and 1820) by providing answers to a questionnaire 1830, from which answers the TPOW 50 generates suggestions for the activities to perform (e.g., based on pre-defined logic, rules, and probability tables of the TPOW 50). Additionally, the user may select the activities manually 1840, or manually adjust the pre-defined activity profiles (e.g., from 1810 and 1820). By defining a different set of activities, the user may compare the duration and cost of test plans having different test processes.

Figure 19:
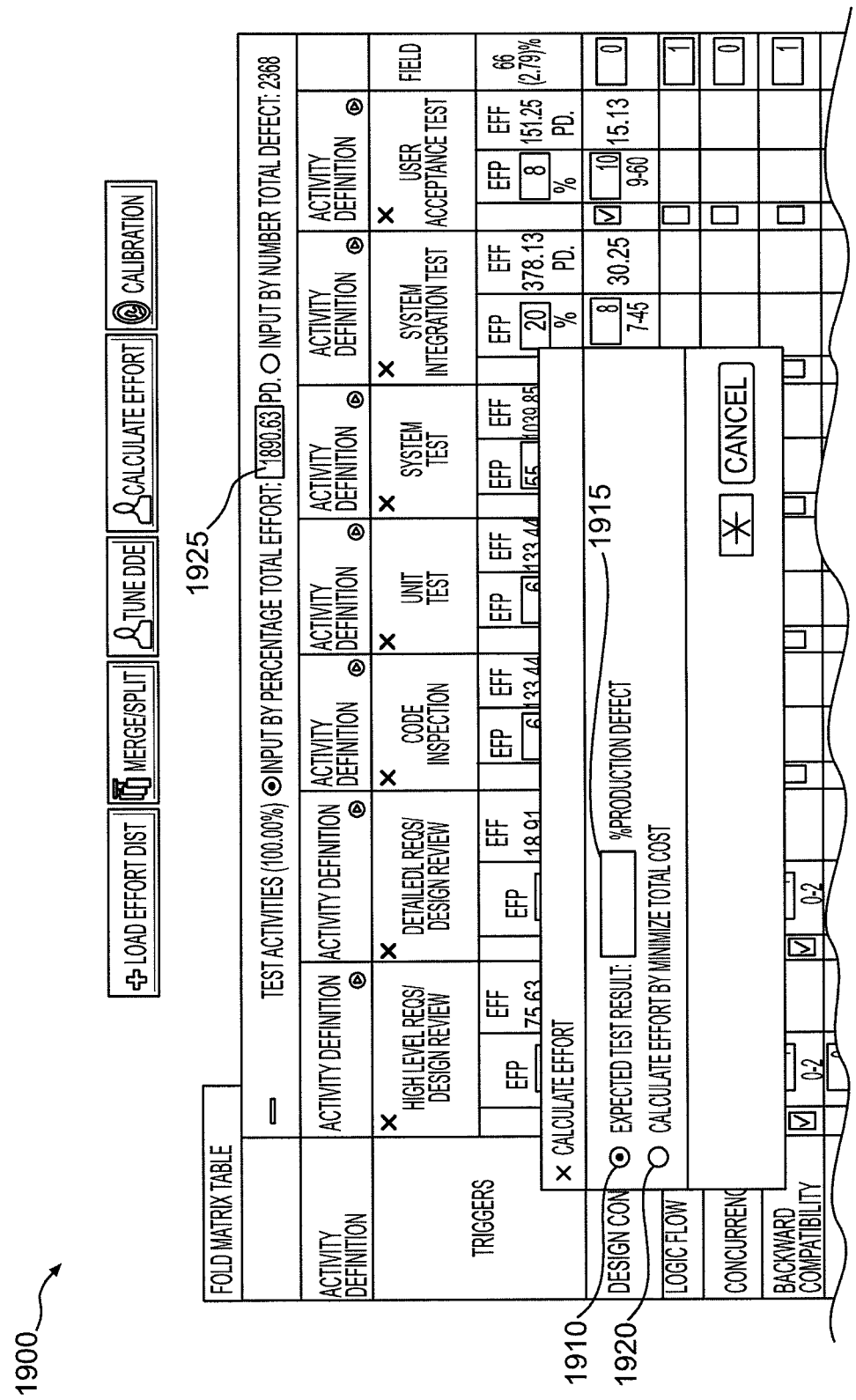

As another example of changing the input data, FIG. 19 shows an exemplary user interface (UI) 1900 and underlying functionality provided in the TPOW 50 that permits the user to change the constraint on which the effort distribution and defect distribution are calculated. For example, by selecting radio button 1910 and entering a number in cell 1915, the user may define the constraint as a maximum percentage of field defects, in which case the TPOW 50 will determine the alternative effort and defect distribution in the manner described with respect to step 632. On the other hand, by selecting radio button 1920 and entering a value in cell 1925, the user may define the constraint as a maximum total cost (e.g., maximum effort defined, for example, in terms of person days), in which case the TPOW 50 will determine the alternative effort and defect distribution in the manner described with respect to step 631. In this manner, implementations of the invention permit the user to change the constraint upon which the alternative effort and defect distributions are calculated.

In embodiments, the test effort can be input by the user or calculated by TPOW 50 according the given conditions (e.g., constraints): the field defect rate (e.g., what percentage of defects will escape to the production environment), and the optimized effort for minimizing the total cost. As described herein, the total cost may be separated to three parts: test cost, defect resolution cost, and business cost. Typically, more defects will be uncovered during testing when more effort is devoted to testing. Thus, there is a relationship between devoted effort and the total cost. In embodiments, the TPOW 50 operates to assist a user in determining the value of the effort that will reduce cost to the lowest possible level.

As another example of changing the input data, FIG. 20 shows an exemplary user interface (UI) 2000 and underlying functionality provided in the TPOW 50 that permits the user to change the values of the estimated defect distribution. By manually adjusting the alternative defect distribution, the user may see what changes result in the alternative schedule and cost.

Figure 21:
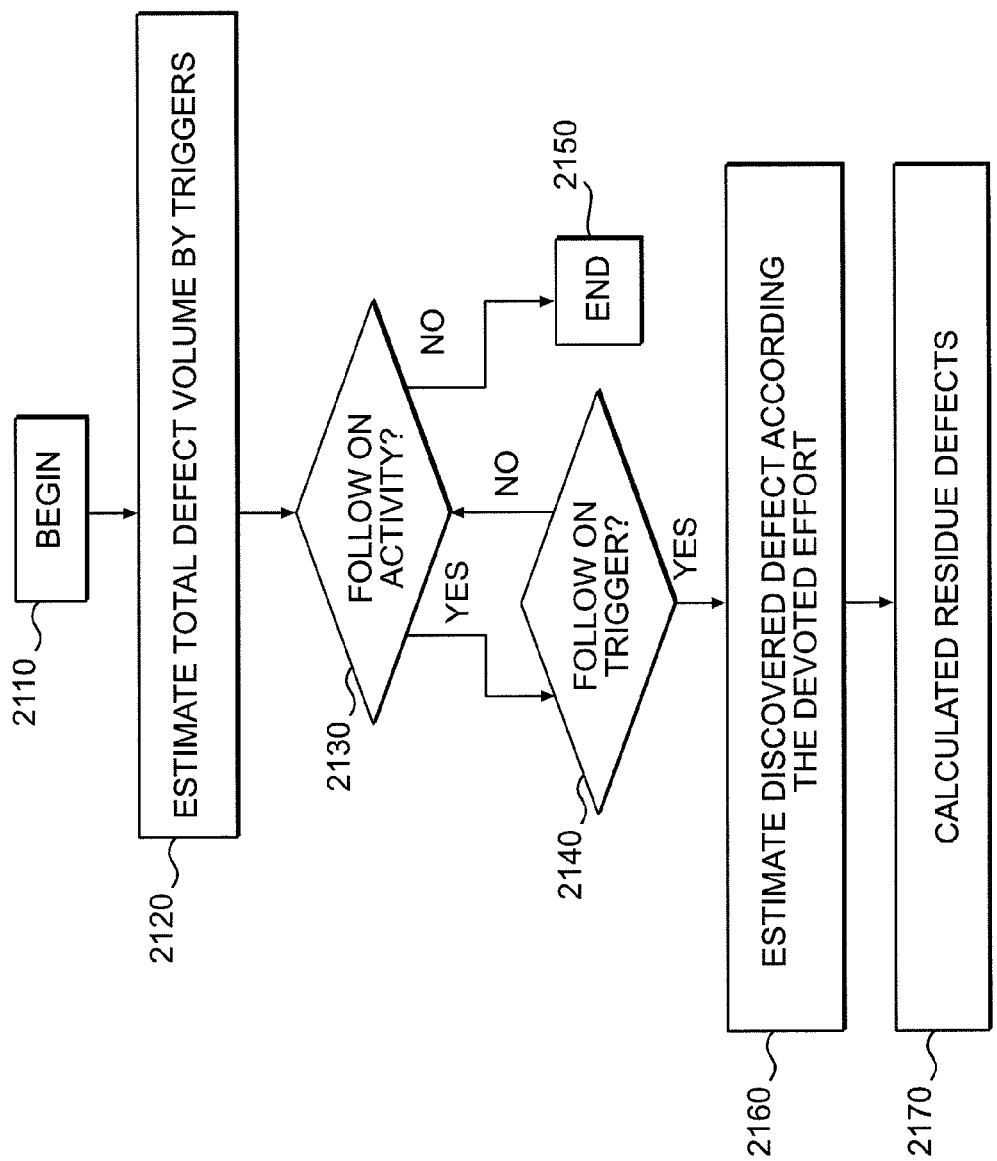
FIG. 21 illustrates a high level flow in accordance with aspects of the invention.

FIG. 21 shows an exemplary flow diagram 2100 and underlying functionality of the TPOW 50 that illustrates the processes performed when a change is made to data of the initial configuration. The flow 2100 illustrates how any changes to the input data of the initial configuration are propagated through the alternative effort and defect distributions. In embodiments, the processes associated with FIG. 21 are performed by the test effect estimation module 36 of the defect projection engine 30 of the TPOW 50. In accordance with aspects of the invention, the defect projection engine 30 calculates a resulting test effect estimate by applying a model (e.g., pre-defined logic, rules, and probability tables) to project defects according to the selected test process, devoted effort, the profile of the system under testing (e.g., reference project and PDI, or Product Difficulty Index, of the current project), and the test efficiency of the test team.

More specifically, at step 2110, the input data of an existing configuration is adjusted (e.g., changed) by a user via a user interface. At step 2120, the test effect estimation module 36 estimates the total defect volume by triggers based on the new configuration. In embodiments, this is performed in a manner similar to that described above with respect to step 610 and FIG. 8, in which the total number of defects is initially determined for all of the trigger but without regard to the activities.

Steps 2130, 2140, and 2150 represent an iterative process in which the test effect estimation module 36 determines which activities are present in the alternative configuration and estimates the defects per trigger per activity based on the estimated total defect volume from step 2120. More specifically, at step 2130, the test effect estimation module 36 determines whether there is a follow on activity (e.g., another activity to analyze in terms of defects). In embodiments, this is performed by examining the saved list of user-defined activities. If the answer at step 2130 is yes, then at step 2140 the test effect estimation module 36 determines whether there is a follow on trigger for the current activity (e.g., another trigger within this activity to analyze in terms of defects). In embodiments, this is performed by examining the predefined list of triggers. If the result at step 2140 is yes, then the process proceeds to step 2160 in which the test effect estimation module 36 estimates the discovered defects per trigger per activity according to the devoted effort and step 2170 in which the test effect estimation module 36 estimates the residue (e.g., field) defects per trigger. In embodiments, steps 2160 and 2170 are performed in a manner similar to step 630 described with respect to FIG. 6. Alternatively, if the result at step 2140 is no, then the process returns to step 2130. Moreover, if the result at step 2130 is no, then the process ends at step 2150. In this manner, the test effect estimation module 36 estimates, based on the changed input data, the discovered defects by triggers in each activity according to the potential defect volume, the devoted effort, and the defect discovery efficiency.

Figure 22:
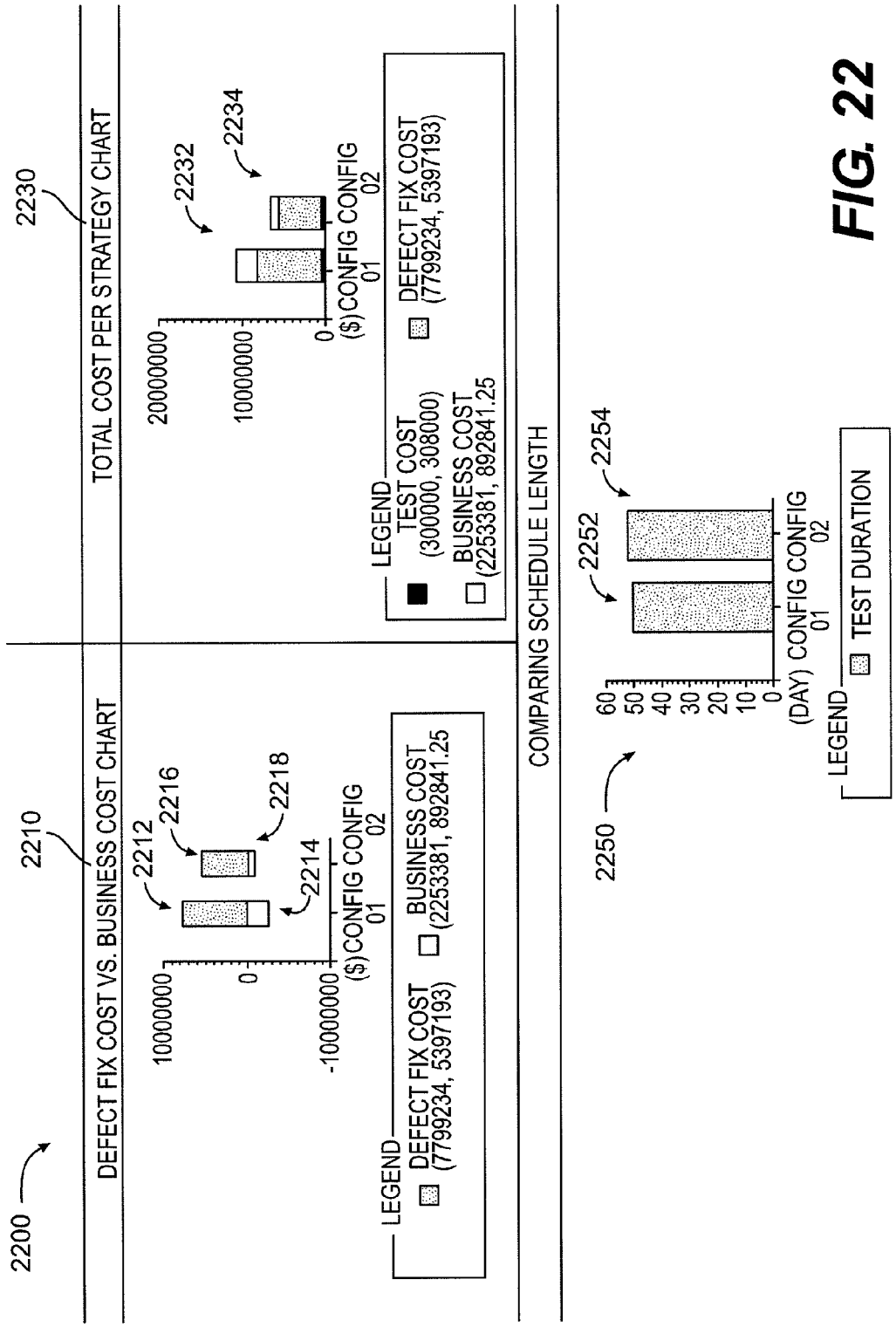
FIG. 22 shows an exemplary user interface and underlying functionality in accordance with aspects of the invention.

FIG. 22 shows an exemplary user interface (UI) 2200 and underlying functionality of the TPOW 50 in which aspects of an initial plan and an alternative plan are displayed side by side for comparison by a user. In embodiments, the UI 2200 may correspond to the dashboard 230 described with respect to FIG. 2. More specifically, the UI 2200 includes a chart 2210 showing the initial plan defect fix cost 2212, initial plan business cost 2214, alternative plane defect fix cost 2216, and alternative plane business cost 2218. As another example, chart 2230 shows a comparison of the initial plan total cost 2232 to the alternative plan total cost 2234. As another example, chart 2250 shows the initial plan schedule duration 2252 and the alternative plan schedule duration 2254. Accordingly, as described herein, implementations of the invention provide the user the ability to perform a what-if analysis of test plans by: changing one or more base input values of an initial test plan; saving the initial inputs into a configuration; predicating new desired discovered and residual defect volumes, cost and/or schedule; updating test effect estimation, cost calculation, and schedule generation according to the devoted effort, and the reference information from the initial project; and compare the new (e.g., alternative) configuration with the initial configuration to view the schedule and cost differences that result.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage medium having programming instructions operable to:

create using a processor of the computer infrastructure an initial test plan including initial estimates of effort and defect distributions, the creating comprising:
receiving empirical data; and
determining test activities based on the empirical data,
wherein the initial estimates of the effort and the defect distribution comprises calculated values associated with each test activity,
create an alternative test plan including alternative estimates of effort and defect distributions, the creating comprising:
providing a questionnaire to a user for adjusting the test activities of the initial test plan;
generating suggestions for a set of alternative test activities based on answers provided by the user for the questionnaire, and
determining alternative test activities based on suggestions selected by the user from the set of alternative test activities,
wherein the alternative estimates of the effort and the defect distribution comprises calculated values associated with each alternative test activity; and display at least one metric of the initial test plan and the alternative test plan side by side for comparison by the user.

2. The method of claim 1, wherein:
the first test plan is generated using initial input data, and
the alternative test plan is generated using alternative input data.

3. The method of claim 2, wherein the programming instructions are further operable to permit a user to define the alternative input data by changing at least one parameter of the initial input data.

4. The method of claim 3, wherein the at least one parameter comprises at least one of:
organization maturity level;
code size;
activities performed during testing;
estimated effort for a trigger and activity;
estimated defects for a trigger and activity;
total test effort for all activities; and
number of field defects.

5. The method of claim 3, wherein the alternative test plan is generated by recalculating the calculated values of the initial test plan based upon the changing the at least one parameter.

6. The method of claim 3, wherein the programming instructions are further operable to limit a changed value of the at least one parameter to a determined range.

7. The method of claim 3, wherein:
the creating the initial test plan includes generating an initial test schedule, and
the creating the alternative test plan includes generating an alternative test schedule.

8. The method of claim 7, wherein:
the programming instructions are further operable to receive from a user a definition of a test team and an assignment of the test team to a testing activity, and
at least one of the initial test schedule and the alternative test schedule is generated based on the definition and the assignment.

9. The method of claim 7, wherein at least one of the initial test schedule and the alternative test schedule includes: a duration per test activity, and a total test duration of all activities.

10. The method of claim 7, wherein the displaying the at least one metric comprises displaying at least a portion of the initial test schedule and the alternative test schedule.

11. The method of claim 3, wherein:
the creating the initial test plan includes generating an initial cost estimate, and
the creating the alternative test plan includes generating an alternative cost estimate.

12. The method of claim 11, wherein:
the initial cost estimate includes an initial test cost, an initial defect-fix cost, and an initial business cost, and
the alternative cost estimate includes an alternative test cost, an alternative defect-fix cost, and an alternative business cost.

13. The method of claim 12, wherein the displaying the at least one metric comprises displaying at least one of:
the initial cost estimate and the alternative cost estimate;
the initial test cost and the alternative test cost;
the initial defect-fix cost and the alternative defect-fix cost;
the initial business cost and the alternative business cost.

14. The method of claim 1, wherein the initial estimates of effort and defect distributions and the alternative estimates of effort and defect distributions are defined in terms of orthogonal defect classification (ODC) triggers and the activities.

15. The method of claim 1, wherein a service provider at least one of creates, maintains, deploys and supports the computing infrastructure.

16. The method of claim 1, wherein the computing infrastructure is provided by a service provider under a subscription and/or fee agreement and/or based on advertising content to one or more third parties.

17. A system comprising:
a test planning optimization workbench including:
a processor operable to:
receive empirical data and determine test activities for an initial test plan based on the empirical data,
provide a questionnaire for adjusting the test activities of the initial test plan,
generate suggestions for a set of alternative test activities for an alternative test plan based on answers provided for the questionnaire, and
determine alternative test activities based on suggestions selected from the set of alternative test activities,
a memory,
a defect projection engine operable to estimate an effort distribution and a defect distribution for the initial test plan and the alternative test plan, wherein the estimates of the effort and the defect distribution for the initial test plan comprises calculated values associated with each test activity, and the estimates of the effort and the defect distribution for the alternative test plan comprises calculated values associated with each alternative test activity,
a schedule generation engine operable to generate a schedule for the initial test plan and the alternative test plan,
a cost calculation engine operable to determine a cost of the initial test plan and the alternative test plan, and
a dashboard operable to display at least one aspect of the initial test plan and the alternative test plan for comparison by a user.

18. The system of claim 17, wherein:
the initial test plan is based on initial input data, and
the alternative test plan is based on alternative input data that is different than the initial input data.

19. The system of claim 18, wherein the test planning optimization workbench further includes a changeable parameters configuration engine operable to determine changeable inputs and restrict a user to changing only the changeable inputs.

20. The system of claim 17, wherein the effort distribution and the defect distribution are defined in terms of orthogonal defect classification (ODC) triggers and the activities.

21. A computer program product comprising a memory having readable program code embodied in the memory, the program code when executed on a computing device causes the computing device to: receive initial input data from a user; determining test activities based on the initial input; create an initial test plan including initial estimates of effort and defect distributions based on the initial input data, wherein the initial estimates of the effort and the defect distribution comprises calculated values associated with each test activity; provide a questionnaire for adjusting the test activities based on the initial input; receive answers to the questionnaire from a user; generate suggestions for a set of alternative test activities for an alternative test plan based on the answers received for the questionnaire; receive alternative input data from the user, the alternative input data comprising a selection of alternative test activities from the suggestions for the set of alternative test activities; create an alternative test plan including alternative estimates of effort and defect distributions based on the alternative input data, wherein the alternative estimates of the effort and the defect distribution comprises calculated values associated with each alternative test activity; and display at least one metric of the initial test plan and the alternative test plan side by side for comparison by a user.

22. The computer program product of claim 21, wherein the initial estimates of effort and defect distributions and the alternative estimates of effort and defect distributions are defined in terms of orthogonal defect classification (ODC) triggers and the activities.

23. The computer program product of claim 21, wherein:
the alternative input data comprises a change to the initial input data, and
the creating the alternative test plan includes propagating the change through the initial estimates of effort and defect distributions to calculate the alternative estimates of effort and defect distributions.

24. A computer system for providing an alternatives analysis for a test plan, the system comprising: a processor and a memory; first program instructions to receiving empirical data and determine test activities based on the empirical data; second program instructions to estimate an effort distribution and a defect distribution for an initial test plan, wherein the estimates of the effort and the defect distribution comprises calculated values associated with each test activity; third program instructions to generate a schedule for the initial test plan; fourth program instructions to determine a cost of the initial test plan; fifth program instructions to provide a questionnaire for adjusting the test activities; sixth program instructions to generate suggestions for a set of alternative test activities for an alternative test plan based on answers provided for the questionnaire; seventh program instructions to determine alternative test activities based on suggestions selected from the set of alternative test activities; eighth program instructions to estimate an alternative effort distribution and a defect distribution for the alternative test plan, wherein the alternative estimates of the effort and the defect distribution comprises calculated values associated with each determined alternative test activity; ninth program instructions to generate a schedule for the alternative test plan; tenth program instructions to determine a cost of the alternative test plan; and eleventh program instructions to display at least one aspect of the initial test plan and the alternative test plan for comparison by a user, wherein the first through eleventh program instructions are stored on the memory for execution by the processor.

25. The system of claim 24, further comprising twelfth program instructions to determine changeable inputs for generating the alternative test plan and restrict a user to changing only the changeable inputs, wherein the changeable inputs comprise the suggestions generated for the set of alternative test activities.

26. The method of claim 1, wherein:
the empirical data comprises a maturity level of an organization performing the activities and a size of code to be tested;
the determining the test activities comprises defining what activities are best suited for the test plan having the maturity level of the organization performing the activities and the size of code to be tested;
the calculated value for the initial estimate of the effort comprises an estimated amount of effort that will be required to complete each activity; and
the calculated value for the initial estimate of the defect distribution comprises an estimated amount of defects that will be identified in each activity.

27. The method of claim 26, wherein the creating the initial test plan further comprises:
receiving a constraint regarding a maximum total project effort or a maximum production defect percentage, wherein the initial test plan is created such that a sum of the estimated effort for all the activities does not exceed the maximum total project effort or the estimated defect distribution for all the activities does not exceed the maximum production defect percentage; and
generating a total cost for the test plan based on the estimates of the effort and the defect distributions, wherein the generating the total cost comprises using cost estimation logic that takes into account empirical cost data that defines a cost to fix a defect during each activity.

* * * * *